US009698643B2

(12) United States Patent
Shimozu et al.

(10) Patent No.: US 9,698,643 B2
(45) Date of Patent: Jul. 4, 2017

(54) STATOR WINDING FOR ROTARY ELECTRIC MACHINE, STATOR FOR ROTARY ELECTRIC MACHINE, METHOD OF MANUFACTURING STATOR FOR ROTARY ELECTRIC MACHINE, AND JIG USED IN MANUFACTURING STATOR FOR ROTARY ELECTRIC MACHINE

(71) Applicant: Toshiba Industrial Products and Systems Corporation, Kawasaki-shi, Kanagawa (JP)

(72) Inventors: Hisaaki Shimozu, Mie (JP); Hisami Katsurayama, Mie (JP); Takeo Kaito, Mie (JP); Hiroaki Nagashima, Mie (JP)

(73) Assignee: TOSHIBA INDUSTRIAL PRODUCTS AND SYSTEMS CORP., Kawasaki-Shi (JP)

( * ) Notice: Subject to any disclaimer, the term of this patent is extended or adjusted under 35 U.S.C. 154(b) by 0 days.

(21) Appl. No.: 15/017,407

(22) Filed: Feb. 5, 2016

(65) Prior Publication Data
US 2016/0156240 A1    Jun. 2, 2016

Related U.S. Application Data

(63) Continuation of application No. PCT/JP2014/068301, filed on Jul. 9, 2014.

(30) Foreign Application Priority Data

Aug. 7, 2013    (JP) .................................. 2013-164176

(51) Int. Cl.
*H02K 3/28*    (2006.01)
*H02K 15/06*    (2006.01)
(Continued)

(52) U.S. Cl.
CPC ................. *H02K 3/28* (2013.01); *H02K 3/34* (2013.01); *H02K 15/02* (2013.01); *H02K 15/065* (2013.01); *H02K 15/067* (2013.01)

(58) Field of Classification Search
CPC .................................. H02K 3/28; H02K 3/34
See application file for complete search history.

(56) References Cited

U.S. PATENT DOCUMENTS

| 4,480,379 A | 11/1984 | Witwer | |
|---|---|---|---|
| 4,486,506 A | * 12/1984 | Kenjo | ..................... B32B 27/08 310/208 |

(Continued)

FOREIGN PATENT DOCUMENTS

| JP | S59-162742 | 9/1984 |
|---|---|---|
| JP | S59-204450 | 11/1984 |

(Continued)

OTHER PUBLICATIONS

International Search Report (with English Translation) issued in International Application No. PCT/JP2014/068301 dated Sep. 22, 2014.

(Continued)

*Primary Examiner* — Dang Le
(74) *Attorney, Agent, or Firm* — DLA Piper LLP US

(57) ABSTRACT

A stator winding of a rotary electric machine includes windings for each pole of each phase being configured by a single layer lap wound coil. The single layer lap-wound coil includes combination coils each configured by two or more divided unit coils of the same phase being disposed one over the other in a radial direction inside slots of a stator core. The combination coils each comprise a first-row unit coil and a second-row unit coil disposed in a radially inner side of the stator core with respect to the first-row unit coil. A turns count of the first-row unit coil equals a turns count of the second-row unit coil. A count of lead wires of the first-row (Continued)

unit coil differs from a count of lead wires of the second-row unit coil.

7 Claims, 21 Drawing Sheets

(51) Int. Cl.
*H02K 3/34* (2006.01)
*H02K 15/02* (2006.01)

(56) References Cited

U.S. PATENT DOCUMENTS

| | | | |
|---|---|---|---|
| 4,831,715 A | 5/1989 | Witwer | |
| 6,011,339 A * | 1/2000 | Kawakami | H02K 1/278 310/208 |
| 6,683,396 B2 * | 1/2004 | Ishida | B25F 5/00 310/130 |
| 2010/0164318 A1 | 7/2010 | Bodin | |

FOREIGN PATENT DOCUMENTS

| | | |
|---|---|---|
| JP | H08-23650 | 2/1996 |
| JP | 2000-083356 | 3/2000 |
| JP | 2003-319594 | 11/2003 |
| JP | 2005-192327 | 7/2005 |
| JP | 2008-545362 | 12/2008 |
| JP | 2010-183741 | 8/2010 |
| JP | 2010-239740 | 10/2010 |
| JP | 2011-125135 | 6/2011 |

OTHER PUBLICATIONS

Written Opinion (with English Translation) issued in International Application No. PCT/JP2014/068301 dated Sep. 22, 2014.
International Preliminary Report on Patentability issued in International Application No. PCT/JP2014/068301 dated Feb. 9, 2015.
English Language Abstract and English Language Translation of JP H08-23650 published Jan. 23, 1996.
English Language Abstract and English Language Translation of JP 2011-125135 published Jun. 23, 2011.
English Language Abstract of JP 2000-083356 published Mar. 21, 2000.
English Language Abstract and English Language Translation of JP 2010-239740 published Oct. 21, 2010.
English Language Abstract and English Language Translation of JP 2003-319594 published Nov. 7, 2003.
English Language Abstract and English Language Translation of JP 2010-183741 published Aug. 19, 2010.
English Language Abstract and English Language Translation of JP 2008-545362 published Dec. 11, 2008.
English Language Abstract and English Language Translation of JP 2005-192327 published Jul. 14, 2005.
English Language Abstract and English Language Translation of JP S59-162742 published Sep. 13, 1984.
English Language Abstract and English Language Translation of JP S59-204450 published Nov. 19, 1984.

* cited by examiner

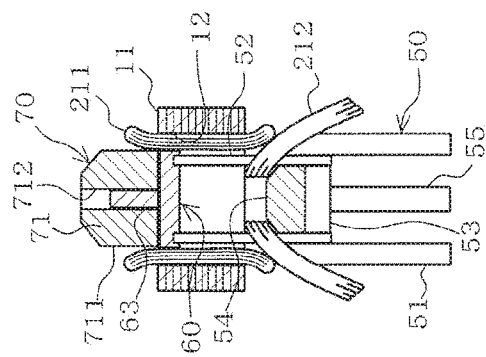
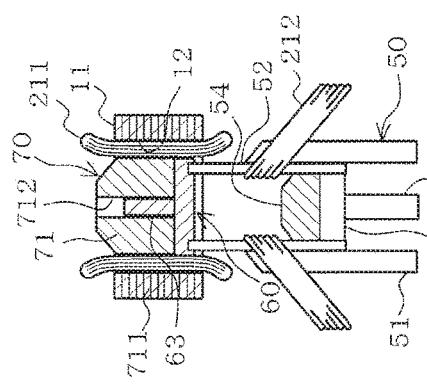
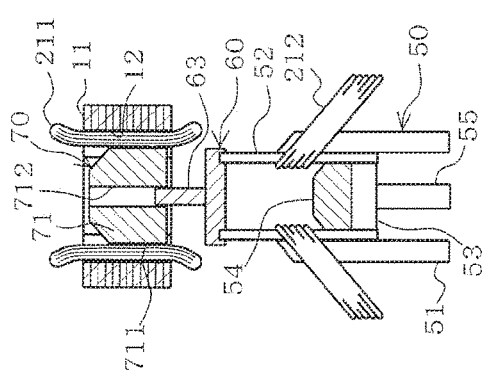
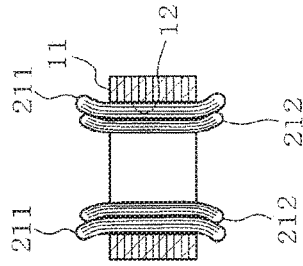
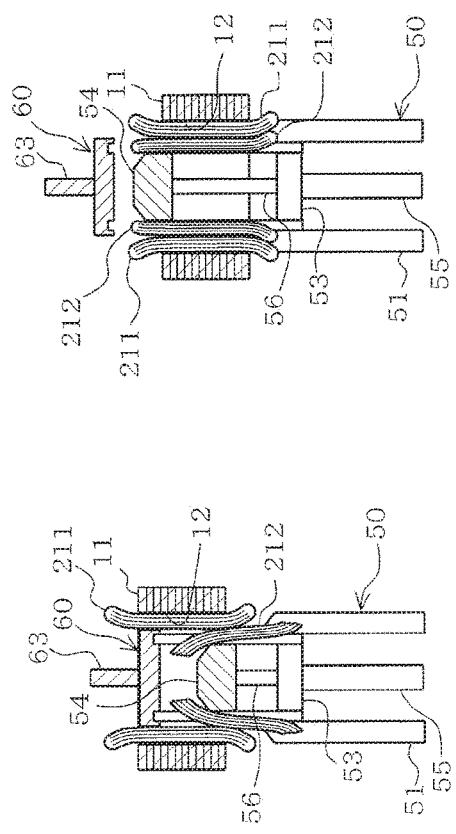

13

14

STATOR WINDING FOR ROTARY ELECTRIC MACHINE, STATOR FOR ROTARY ELECTRIC MACHINE, METHOD OF MANUFACTURING STATOR FOR ROTARY ELECTRIC MACHINE, AND JIG USED IN MANUFACTURING STATOR FOR ROTARY ELECTRIC MACHINE

CROSS-REFERENCE TO RELATED APPLICATION(S)

This application is a continuation to an International Application No. PCT/JP2014/068301, filed on Jul. 9, 2014 which is based upon and claims the benefit of priority from Japanese Patent Application No. 2013-164176, filed on, Aug. 7, 2013 the entire contents of which are incorporated herein by reference.

FIELD

Embodiments disclosed herein relate to a stator winding for rotary electric machine, a stator for rotary electric machine, a method of manufacturing stator for rotary electric machine, and a jig used in manufacturing stator for rotary electric machine.

BACKGROUND

Examples of methods of forming a stator winding of the rotary electric machine include a method using a concentric wound coil and a method using a lap wound coil. The concentric wound coil is configured by combining plural concentric coils having different diameters which are arranged concentrically so that the diameters of the coils become gradually greater. The perimeters of the coils used in the concentric wound coil become greater toward the radially outward side of the concentric wound coil. The portions of the stator winding located outside the slots do not contribute to the performance of the stator winding. Thus, in a stator winding employing a concentrically wound coil, greater amount of wasteful portions exist in the radially outward side of the coil.

The lap wound coil, on the other hand, is configured by disposing plural coils having the same diameter one over the other in the radial direction of the stator while shifting the slots in which the coils are inserted. The amount of portions of stator windings located outside the slots are less in a lap wound coil compared to a concentric wound coil and thus, there is less waste in the windings in a lap wound coil. However, arrangement of the lap wound coil is much more complicated compared to the concentric wound coil. Because the lap wound coil requires large number of windings with poor arrangement flexibility, it is difficult to insert the windings into the slots of the stator core. It has thus, been difficult to mechanize the task of inserting coils in a configuration employing a lap wound coil.

SUMMARY

Thus, there is provided a stator winding for rotary electric machine, a stator for rotary electric machine, a method of manufacturing stator for rotary electric machine, and a jig used in manufacturing stator for rotary electric machine capable of reducing wasteful use of stator windings and facilitating insertion of stator windings into the slots of the stator core.

In one embodiment, a stator winding of a rotary electric machine is provided with windings for each pole of each phase being configured by a single layer lap wound coil. The single layer lap-wound coil comprises combination coils each configured by two or more divided unit coils of the same phase being disposed one over the other in a radial direction inside slots of a stator core.

In one embodiment, a stator is provided with an insulation sheet between each of the unit coils disposed adjacent in the radial direction of the stator core.

In one embodiment, a method of manufacturing a stator of a rotary electric machine includes inserting an X–1th row unit coil into the slots, where X is an integer equal to or greater than 2 and represents a count of rows of the unit coils; fitting a coil retaining jig with the stator core to enclose an opening of the slots; and pushing the coil retaining jig apart from the stator core and inserting an Xth row unit coil into the slots.

In one embodiment, a jig used in the method of manufacturing a stator of a rotary electric machine is provided with a main portion configured to be fitted to the stator core; and a retaining portion protruding from the main portion and being configured to be inserted into the slots to enclose openings of the slots and thereby preventing the unit coils from coming out of the slots.

BRIEF DESCRIPTIONS OF THE DRAWINGS

FIGS. 10A, 10B, 10C, 10D, 10E, and 10F illustrate the steps of inserting the first-row coil into the slot in the chronological order.

FIGS. 11A, 11B, 11C, 11D, 11E, and 11F illustrate the steps of inserting the second-row coil into the slot in the chronological order.

Figure 12:
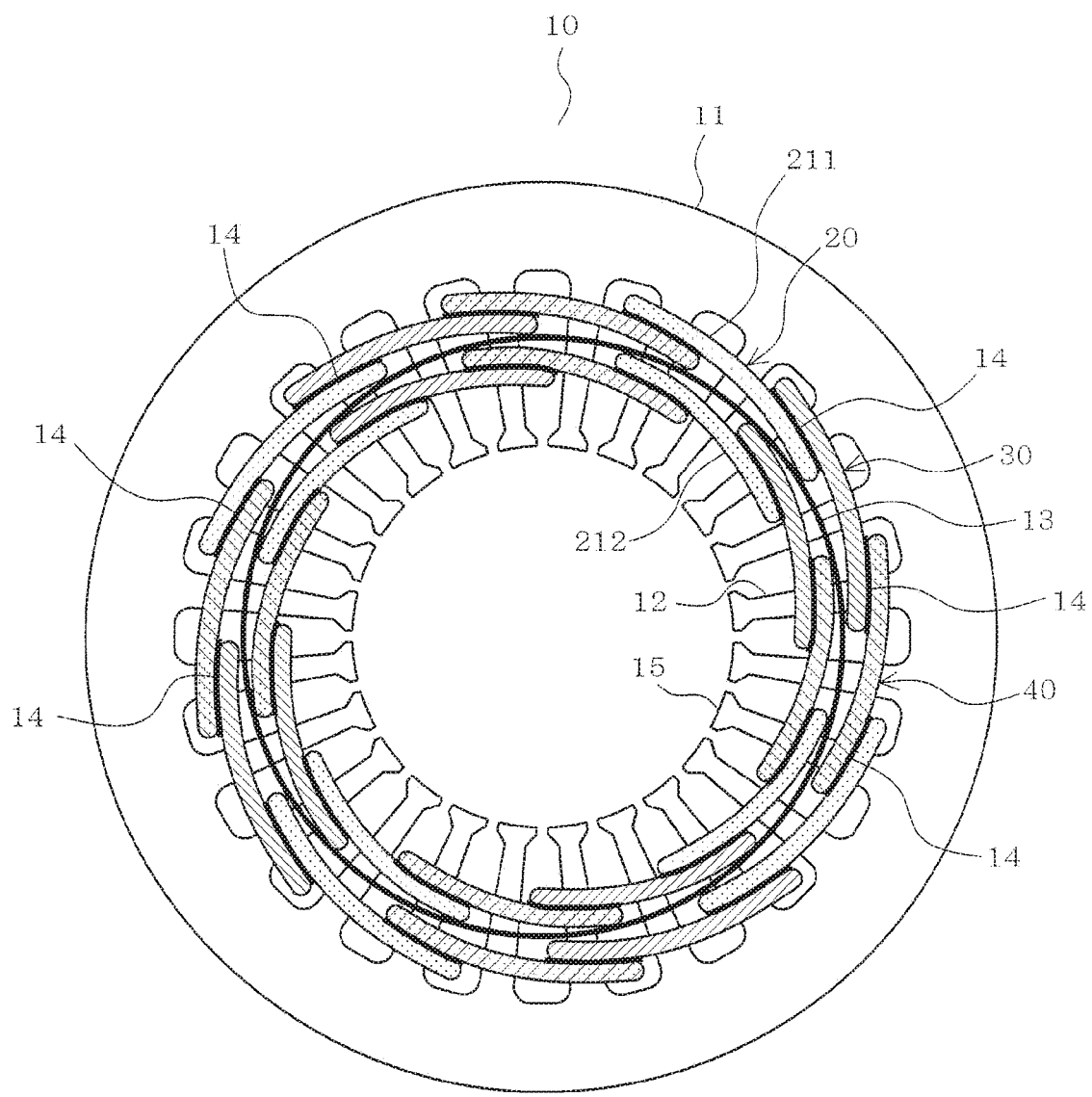

FIG. 12 is a plan view of the stator provided with an insulation paper.

Figure 13A:
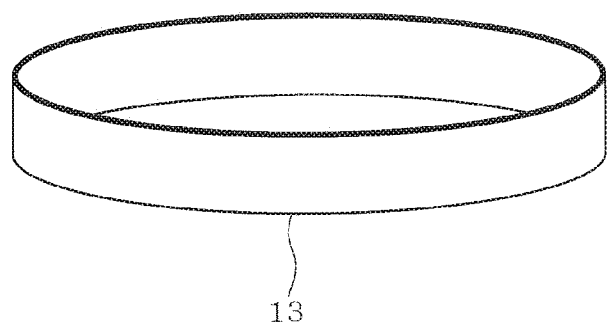
Figure 13B:
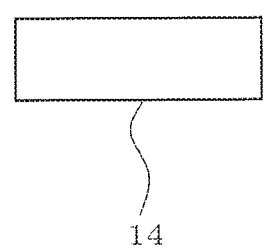

FIG. 13A illustrates a first inter-phase insulation paper and FIG. 13B illustrates a second inter-phase insulation paper.

Figure 2:
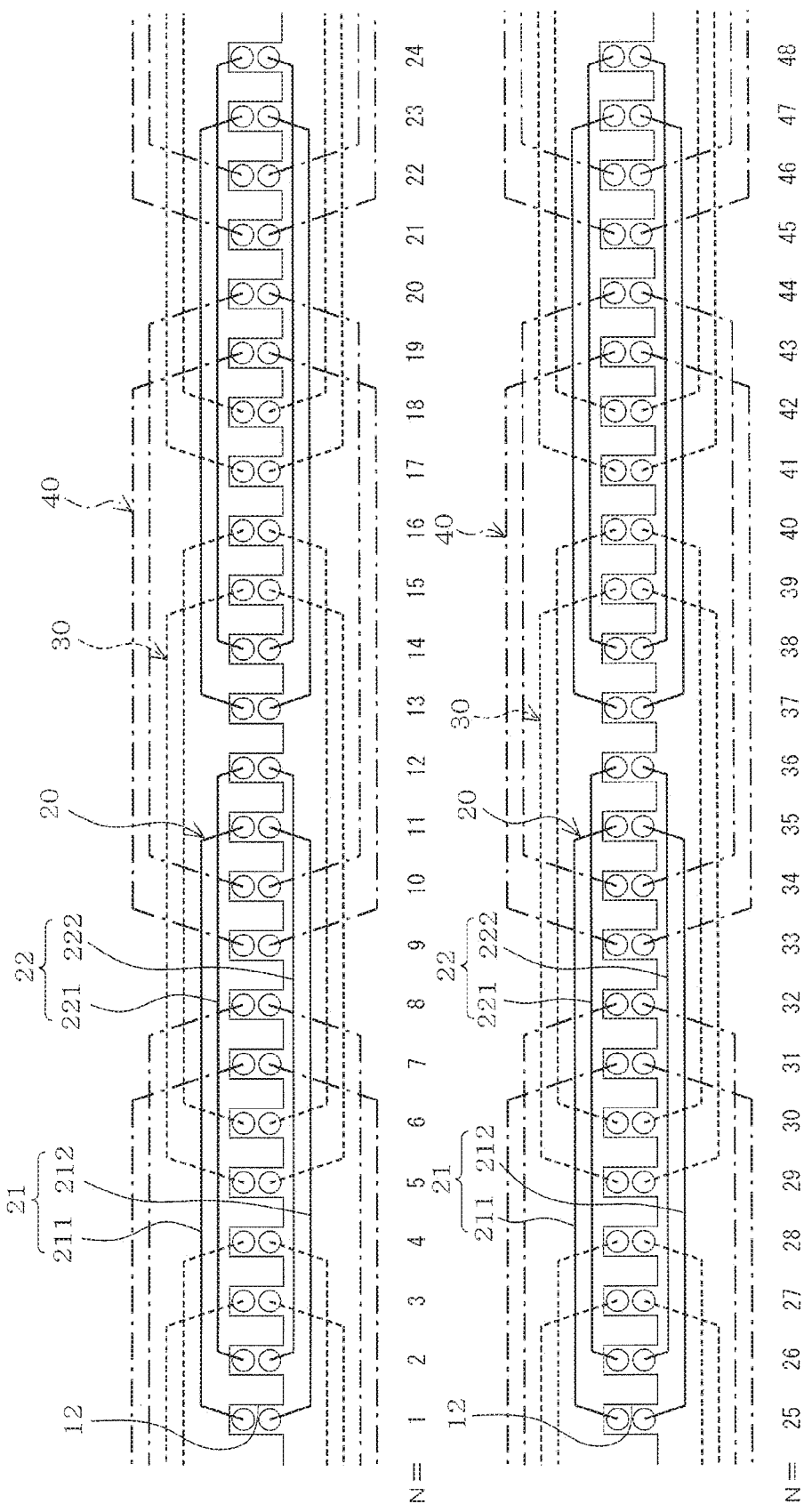
FIG. 2 is a view illustrating the arrangement of a stator winding.
Figure 14:
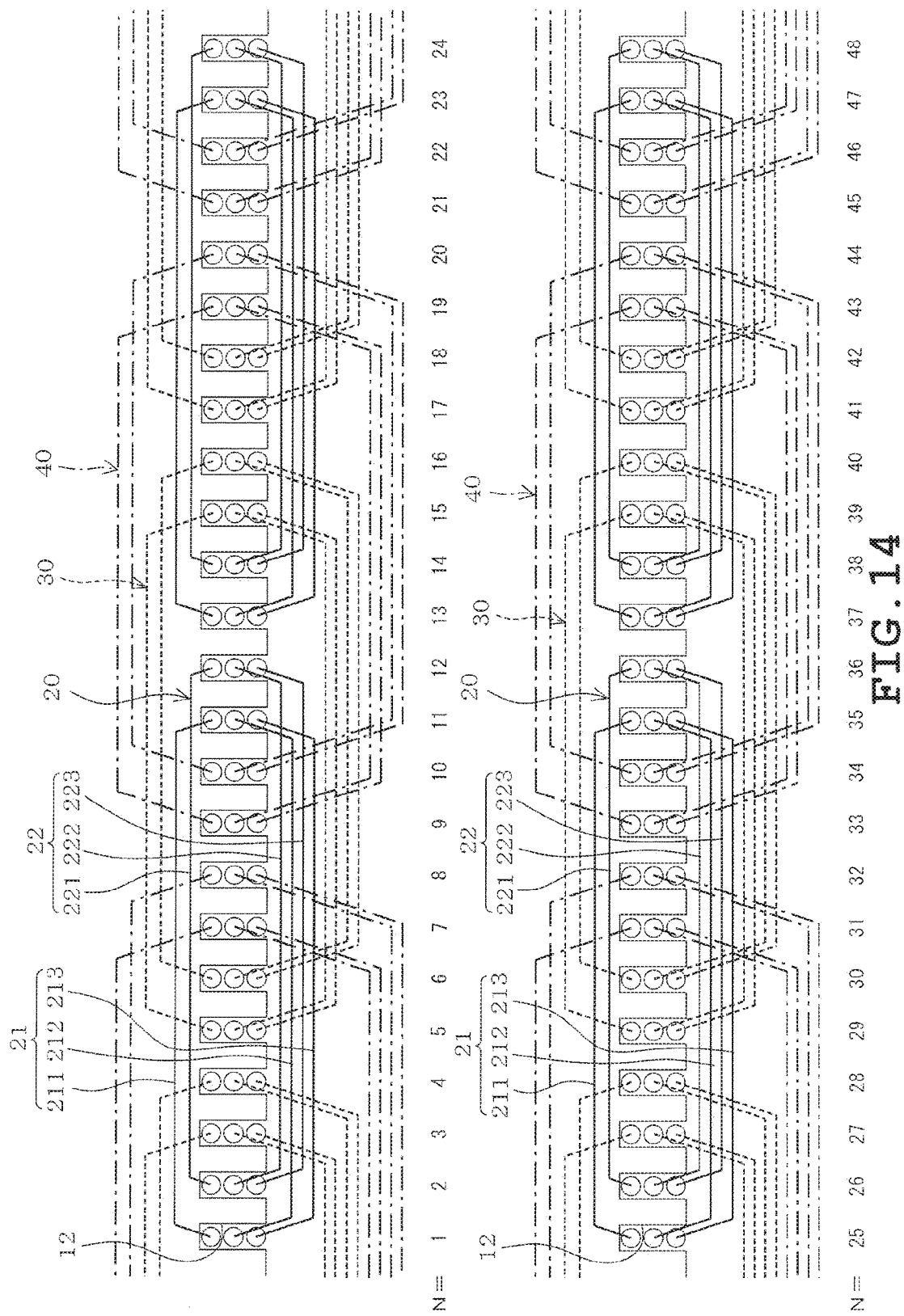

FIG. 14 pertains to a second embodiment and corresponds to FIG. 2.

Figure 15:
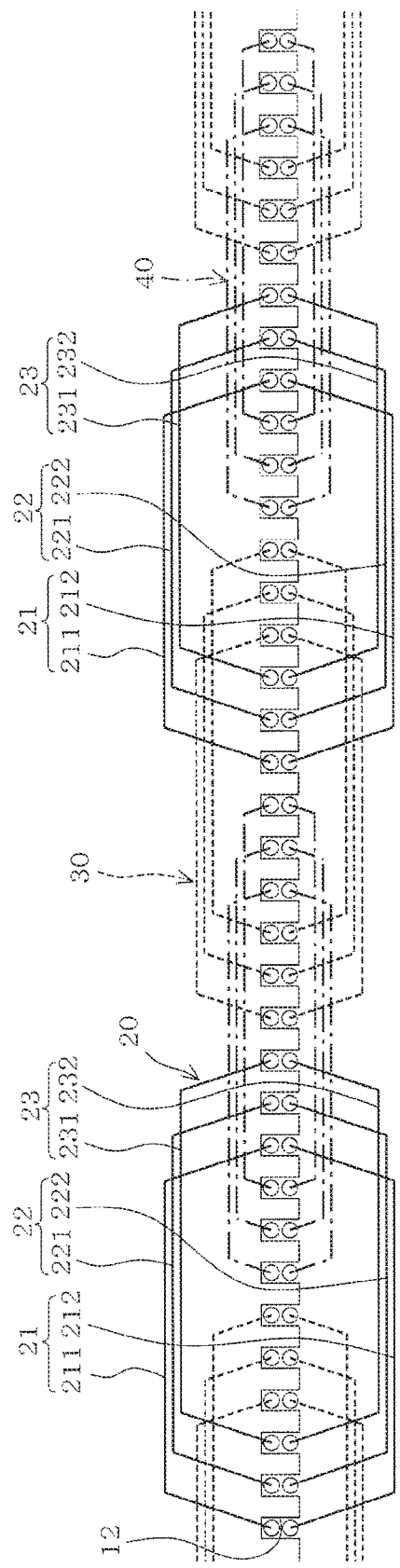

FIG. 15 pertains to a third embodiment and corresponds to FIG. 2.

Figure 16:
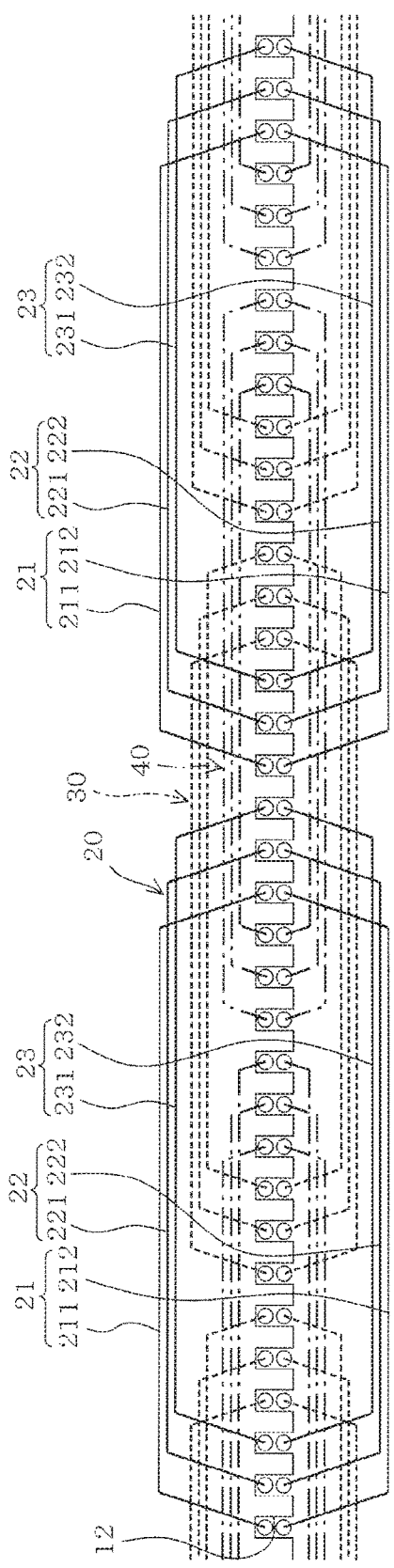

FIG. 16 pertains to a fourth embodiment and corresponds to FIG. 2.

Figure 17:
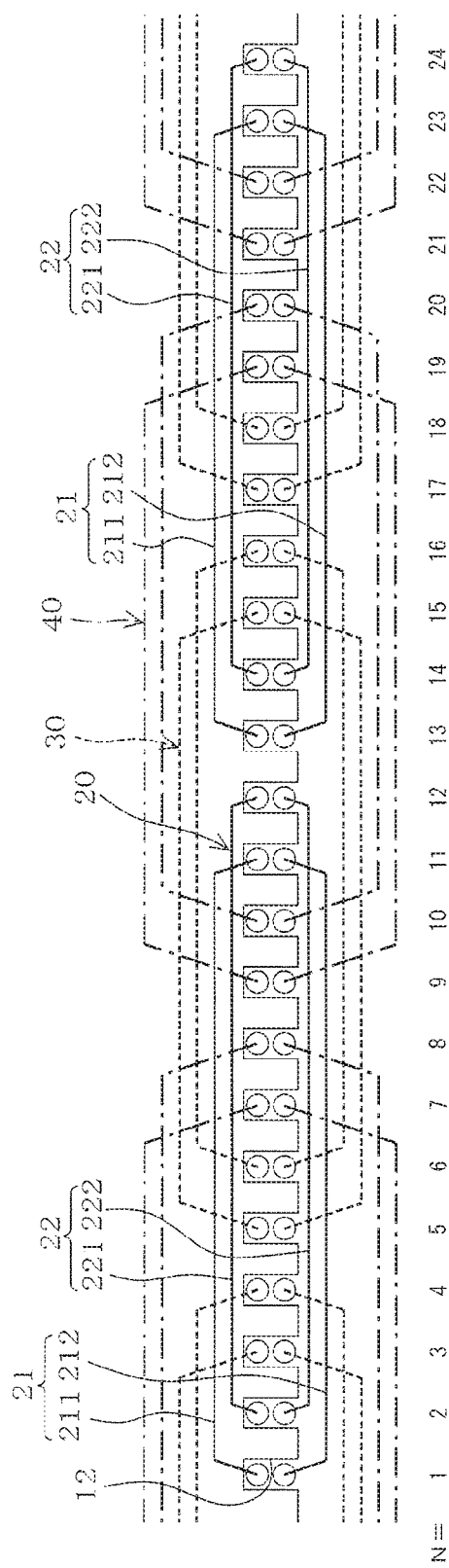

FIG. 17 pertains to a fifth embodiment and corresponds to FIG. 2.

Figure 18:
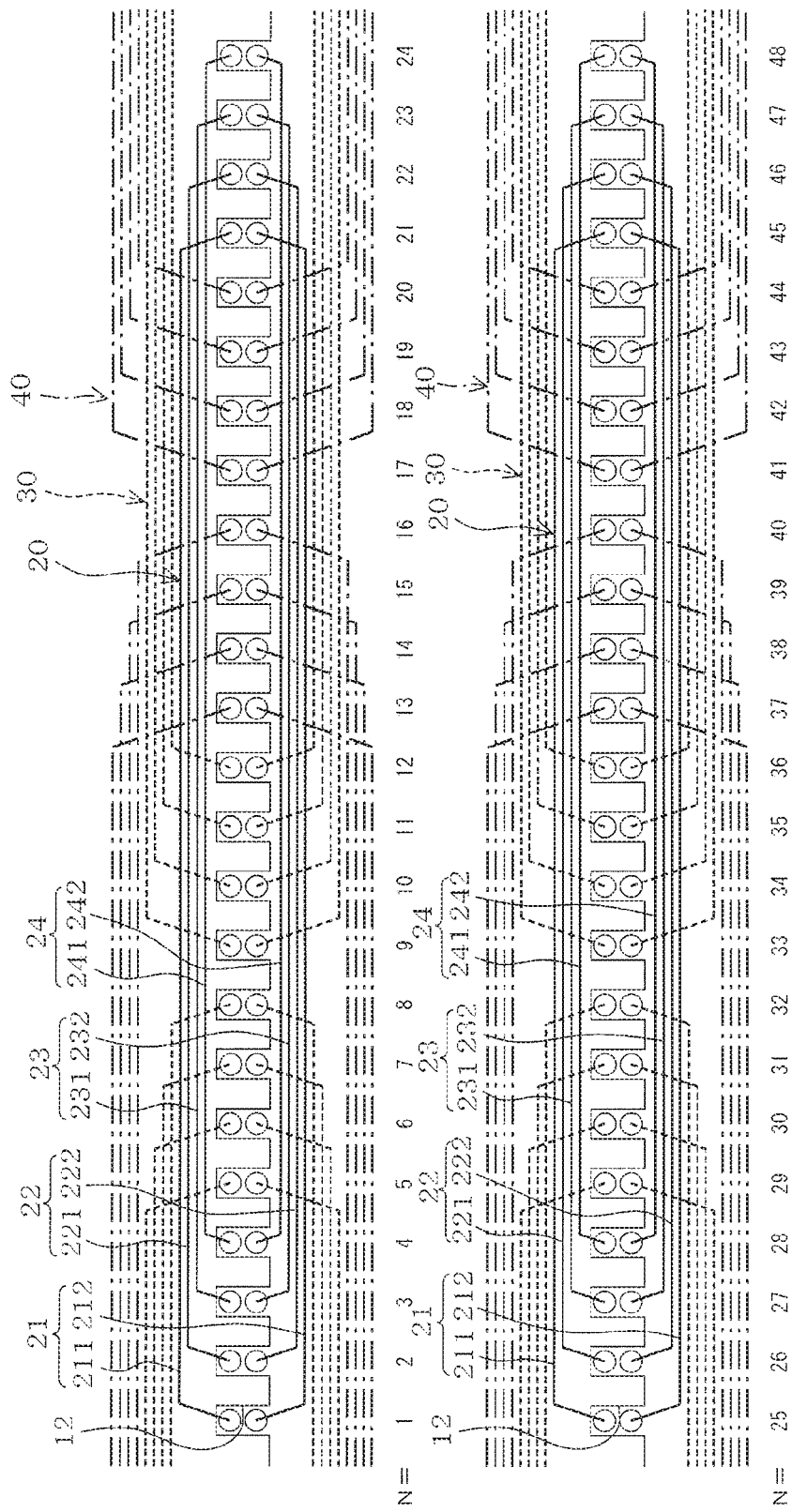

FIG. 18 pertains to a sixth embodiment and corresponds to FIG. 2.

Figure 19:
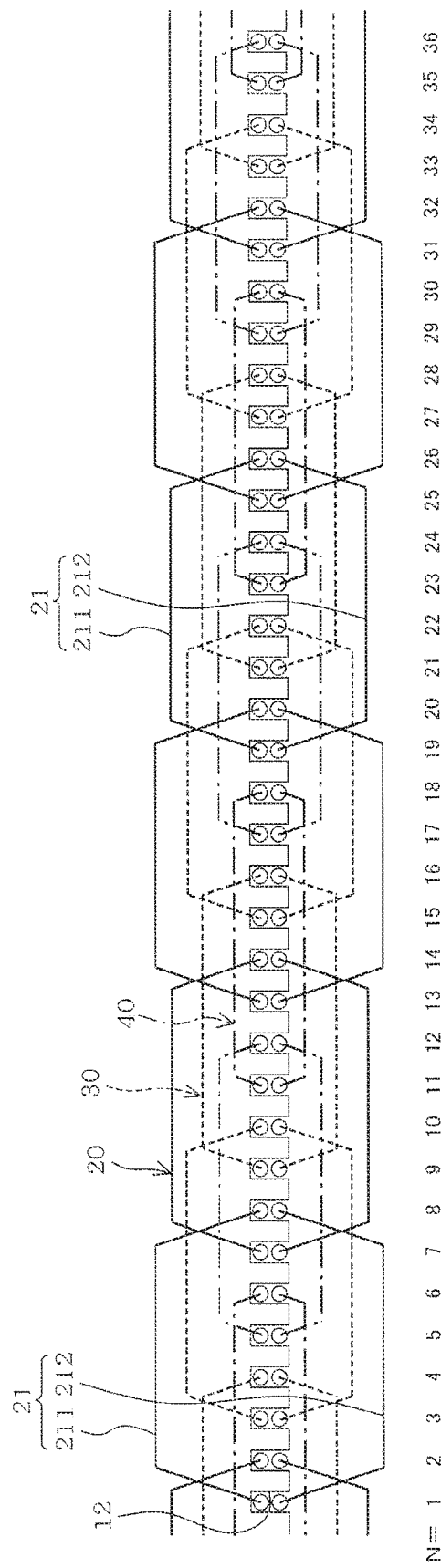

FIG. 19 pertains to a seventh embodiment and corresponds to FIG. 2.

Figure 20:
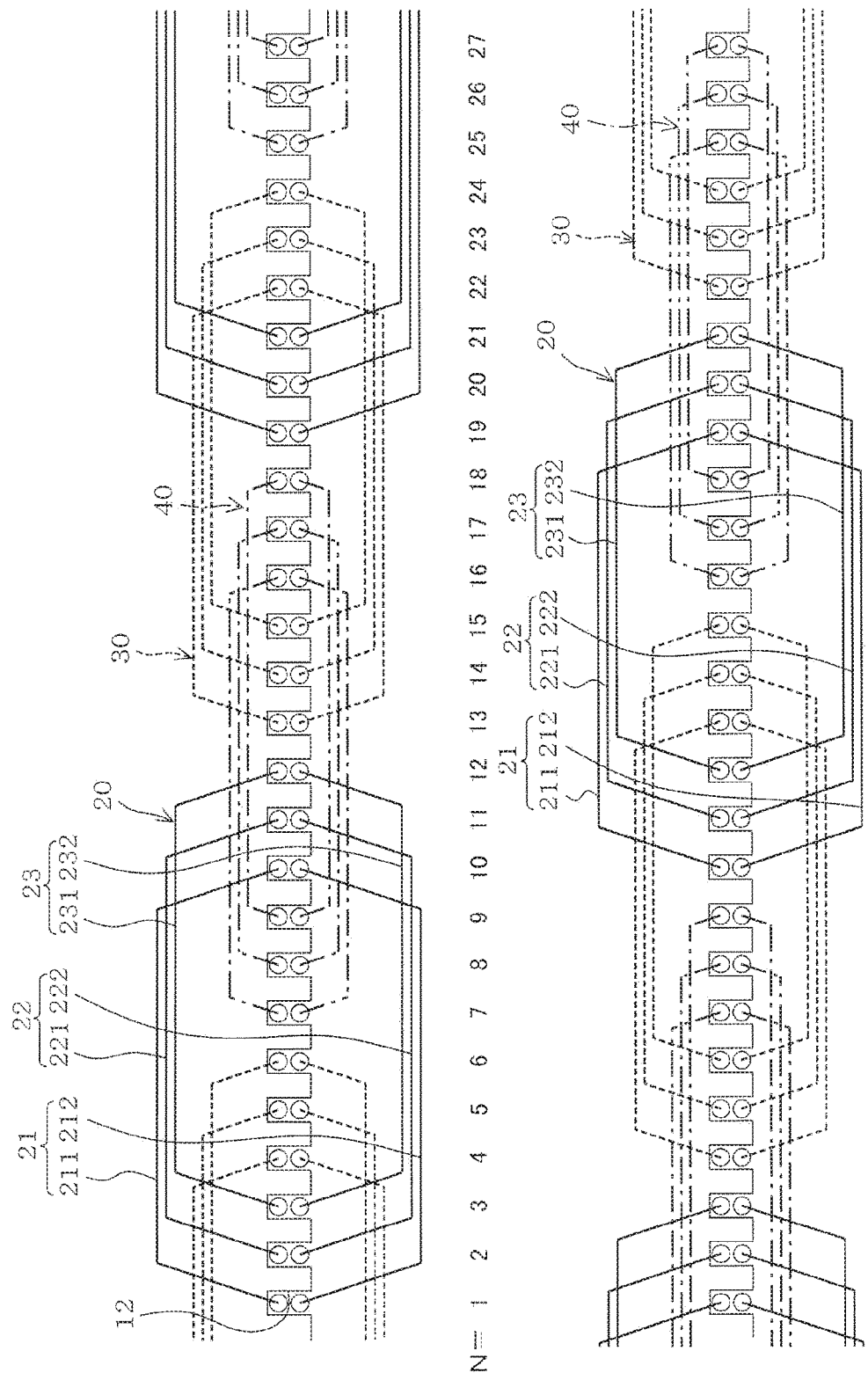

FIG. 20 pertains to an eighth embodiment and corresponds to FIG. 2.

Figure 21:
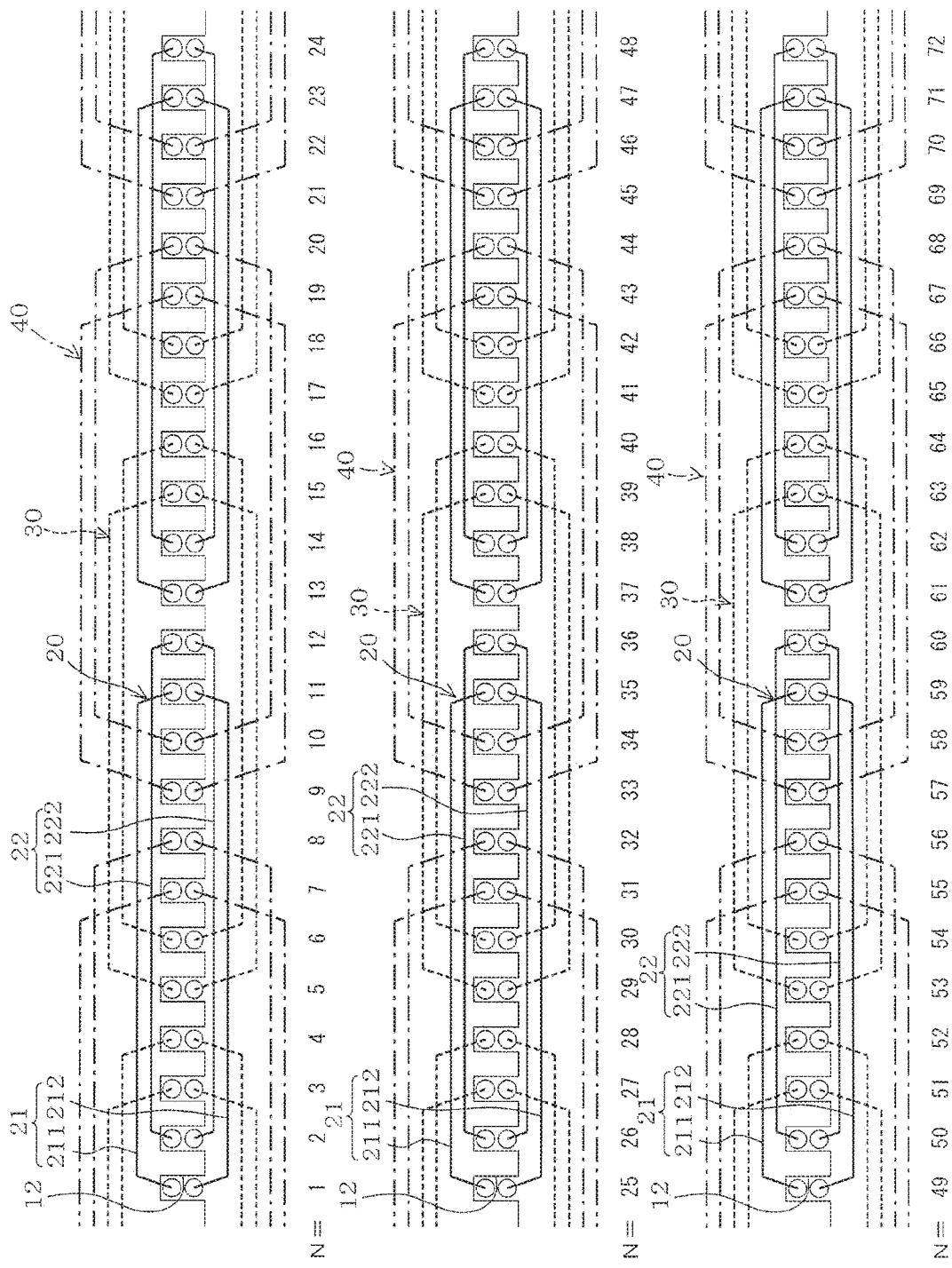

FIG. 21 pertains to a ninth embodiment and corresponds to FIG. 2.

Figures 5A, 5B:
FIG. 5A illustrates a cross-sectional view taken along line a-a of FIG. 4
FIG. 5B illustrates a cross-sectional view taken along line b-b of FIG. 4.
Figure 22A:
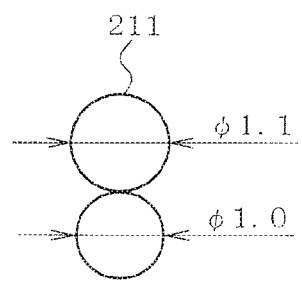
Figure 22B:
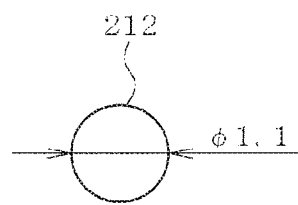

FIGS. 22A and 22B pertain to a tenth embodiment and correspond to FIGS. 5A and 5B, respectively.

DESCRIPTION

Next, a description will be given on embodiments of a stator winding for rotary electric machine, a stator for rotary electric machine, a method of manufacturing stator for rotary electric machine, and a jig used in manufacturing stator for rotary electric machine. Elements that are substantially identical across the embodiments are identified with identical reference symbols and are not re-described.

First Embodiment

First, a description will be given on a first embodiment with reference to FIGS. 1 to 13.

Figure 1:
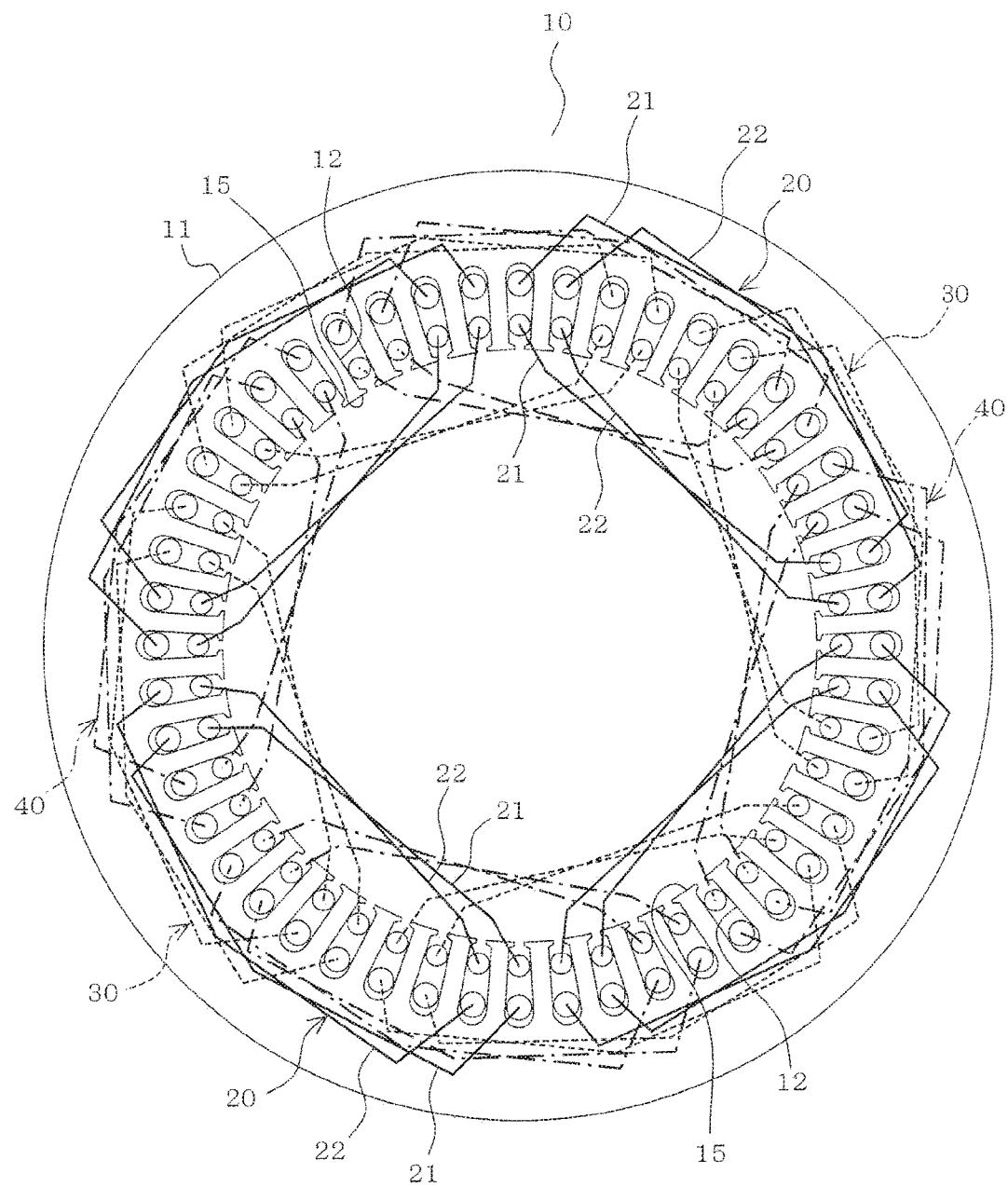
FIG. 1 is a plan view of a stator of a rotary electric machine of one embodiment.

As illustrated in FIG. 1, a stator 10 of a rotary electric machine driven by three-phase alternating current is provided with a stator core 11 and stator windings for each of the three-phases, namely, a stator winding 20 for the U phase, a stator winding 30 for the V phase, and a stator winding 40 for the W phase. The stator core 11 is formed by blanking an electromagnetic steel plate into a certain shape and stacking multiple layers of the blanked-out electromagnetic steel plates. A total of 48 slots 12 are formed on the stator core 11. The stator windings 20, 30, and 40 are placed in the slots 12. The stator 10 is thus, configured to have 4 poles and 48 slots.

The stator windings 20, 30, and 40 are identical in structure and thus, a description will be given on the structure of the windings based on the U-phase stator winding 20. Each of the poles of the U-phase stator winding 20 is configured by a first combination coil 21 and a second combination coil 22 as illustrated in FIG. 1 and FIG. 2. In this example, the U-phase stator winding 20 is provided with 4 pairs of the first combination coil 21 and the second combination coil 22. The first combination coil 21 and the second combination coil 22 are each placed in the slots 12 of the stator core 11. Each pair of the first combination coil 21 and the second combination coil 22 form a lap wound coil for each of the poles.

Each of the 48 slots 12 illustrated in FIG. 2 are identified by N which is an integer ranging from 1 to 48. When a given slot 12 is identified as a first slot, a slot 12 coming in the Nth order is identified as an Nth slot 12. The first combination coil 21 and the second combination coil 22 are identical in structure except for their location. For example, the first combination coil 21 is placed in the first slot and the eleventh slot. The second combination coil 22 is placed in a location shifted by 1 slot from the first combination coil 21, that is, in the second slot and the twelfth slot. In this example, stator windings other than those configuring the U-phase coil, that is, the V-phase stator winding 30 and the W-phase stator winding 40 are not placed in the first slot and the eleventh slot and in the second slot and the twelfth slot. The first combination coil 21 and the second combination coil 22 thus, serve as a single-layer lap wound coil.

Coil pitch K of each coil is obtained by the following equation (1). In this example, the coil pitch K of the first combination coil 21 and the second combination coil 22 is K=83.3%. In the equation, S represents the slot pitch, P indicates the pole count, and Z indicates the slot count. In the present embodiment, slot pitch S indicates the difference between the eleventh slot and the first slot or the difference between the twelfth slot and the second slot for example, in which case, slot pitch S=10. Further, in the present embodiment, the stator 10 is provided with 4 poles and 48 slots and thus, pole count P=4 and slot count Z=48.

$$K = S \times P / Z \times 100 \tag{1}$$

The first combination coil 21 and the second combination coil 22 configuring the lap wound coil are identical in structure and thus, description of the first combination coil 21 and the second combination coil 22 will be given based on the first combination coil 21. The first combination coil 21 is divided into two or more unit coils of the same phase. In the present embodiment, the first combination coil 21 is divided into two U-phase unit coils, namely, a first-row unit coil 211 and a second-row unit coil 212. The first-row unit coil 211 disposed in the slot 12 is located in the radially outer side, that is, the outer peripheral side within the slot 12 of the stator core 11. The second-row unit coil 212 disposed in the slot 12 is located in the radially inner side, that is, the inner peripheral side within the slot 12 of the stator core 11.

Figure 3:
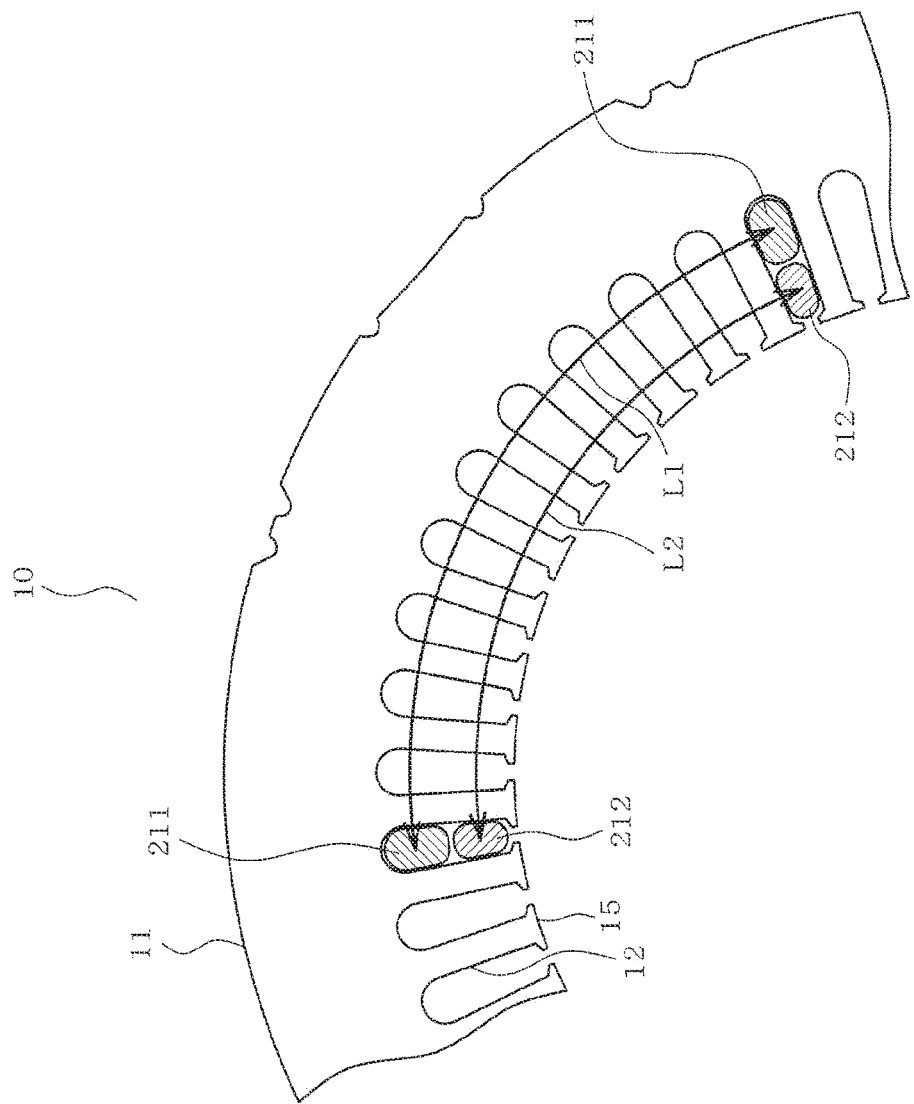
FIG. 3 is a broken view of a portion of the stator.
Figure 4:
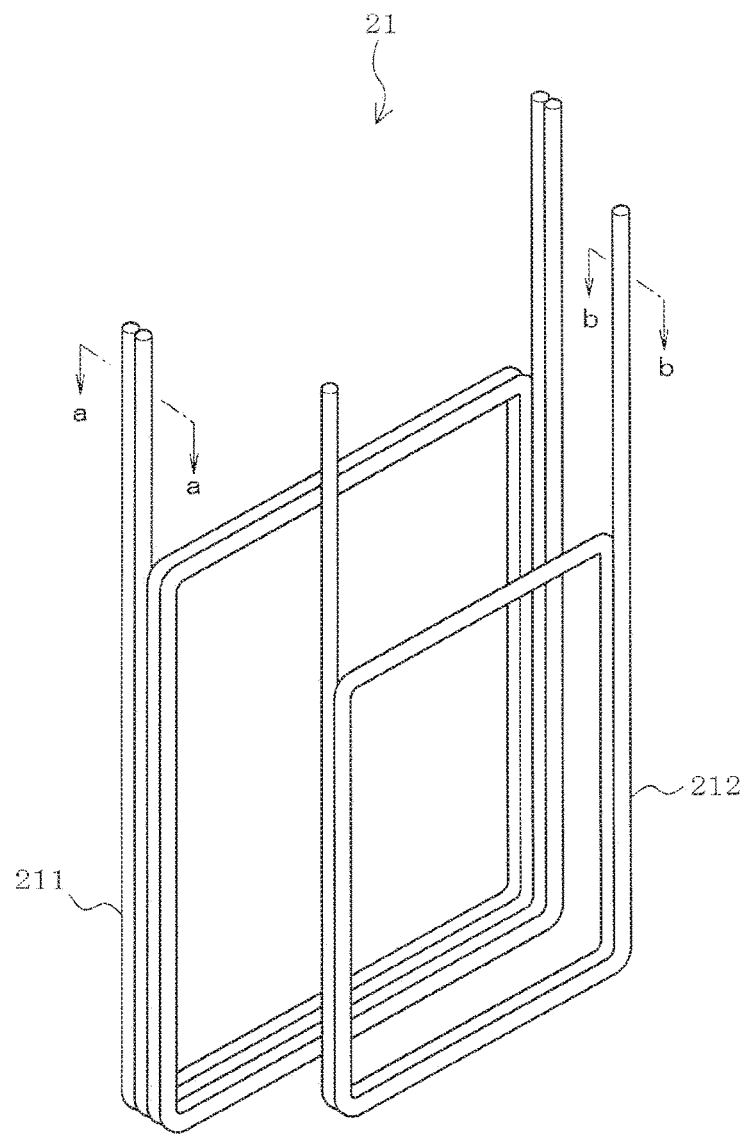
FIG. 4 is a perspective view of a first-row unit coil and a second-row unit coil.

Both the first-row unit coil 211 and the second-row unit coil 212 have the same turns count of 26 for example. The structure of the first-row unit coil 211 and the second-row unit coil 212 slightly differ. More specifically, the perimeter of the second-row unit coil 212 provided in the inner peripheral side is less than the perimeter of the first-row unit coil 211 provided in the outer peripheral side as illustrated in FIGS. 3 and 4. This is because distance L2 between the slots in which the second-row coil 212 is disposed is less than the distance L1 between the slots in which the first-row coil 211 is disposed since the second-row coil 212 is disposed radially inward of the stator core 11 as compared to the first-row coil 211 as illustrated in FIG. 3.

The first combination coil 21 is configured by windings having two or more different wire diameters. The count of lead wires of the first-row coil 211 is different from the count of lead wires of the second-row coil 212. As illustrated in FIGS. 4 and 5A, the first-row coil 211 is configured by 2 windings each having a diameter of 1.1 mm. This means that the count of lead wires of the first-row coil 211 is 2. As illustrated in FIGS. 4 and 5B, the second-row coil 212 is configured by 1 winding having a diameter of 1.0 mm. This means that the count of lead wires of the second-row coil 212 is 1.

Next, a description will be given on a method of manufacturing the stator 10 provided with stator windings 20, 30, and 40. When inserting each of the coils 211, 221, 212, and 222 into each of the slots 12 of the stator core 11, a coil inserting jig 50, an aligning jig 60, and a coil retaining jig 70 illustrated in FIG. 6 are used.

First, a description will be given on the structures of the coil inserting jig 50, the aligning jig 60, and the coil retaining jig 70. The coil inserting jig 50 is provided with plural wedge guides 51, plural blades 52, a blade holder 53, and a stripper 54. The count of wedge guides 51 provided to the coil inserting jig 50 is equivalent to the count of slots 12 provided to the stator core 11. The wedge guide 51 is shaped like a bar elongated in the axial direction of the stator core 11. The wedge guides 51 are disposed so as to collectively define a cylindrical shape. The base end of each wedge guide 51 is secured to a wedge holder not illustrated. Wedge spacing 511 and coil spacing 512 are formed between each of the wedge guides 51. Wedges not illustrated are inserted into the wedge spacings 511. Each of the coils 211, 221, 212, and 222 are passed through the coil spacings 512.

Figure 8:
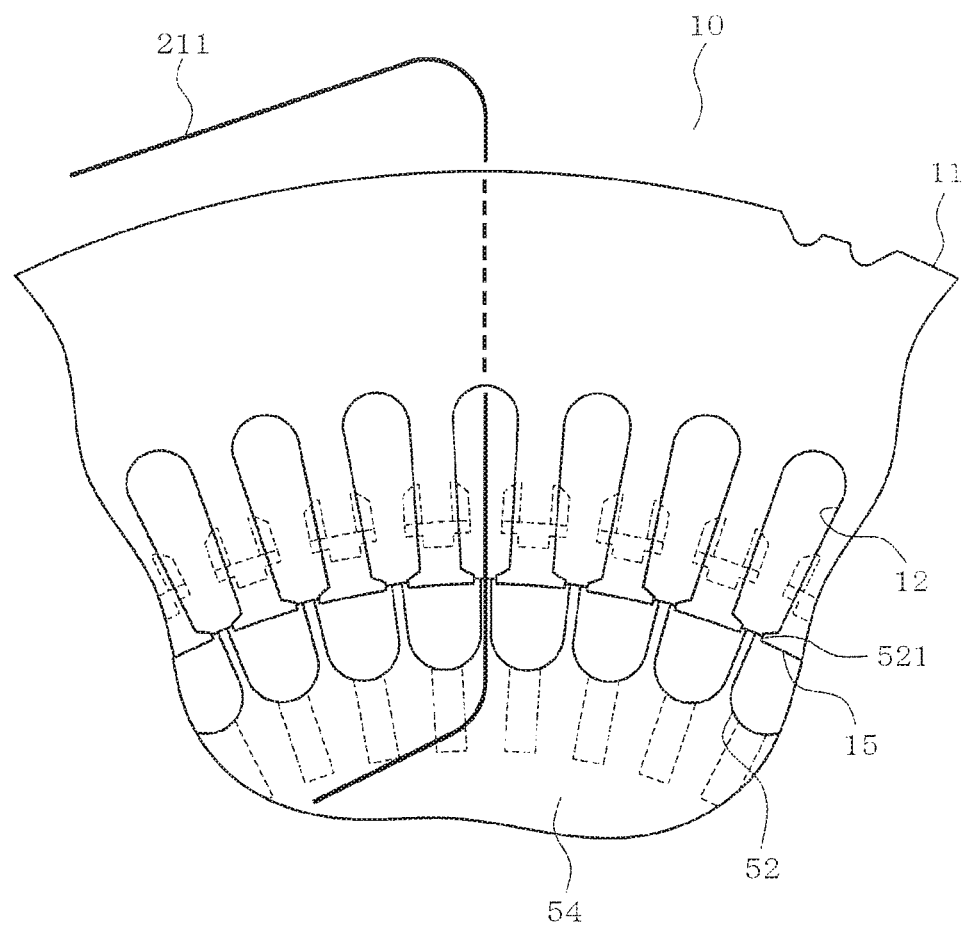
FIG. 8 is a plan view of a coil and the coil inserting jig used when the coil is being inserted into a slot.

The blade 52, the blade holder 53, and the stripper 54 are provided in the inner side of the cylindrical shape formed of the wedge guides 51. The count of blades 52 provided to the coil inserting jig 50 is equivalent to the count of slots 12 provided to the stator core 11. The blade 52 is shaped like a semi-cylinder elongated in the axial direction of the stator core 11. The blades 52 are disposed so as to collectively define a cylindrical shape. The planar surface side of the semi-cylindrical blade 52 faces the exterior of the cylindrical shape. As illustrated in FIG. 8, a guide portion 521 shaped like a rectangular groove is formed on a part of a planar portion located on the outer peripheral side of the blade 52. The guide portions 521 are configured to be placed in fitting engagement with the ends of teeth 15 of the slots 12.

Figure 6:
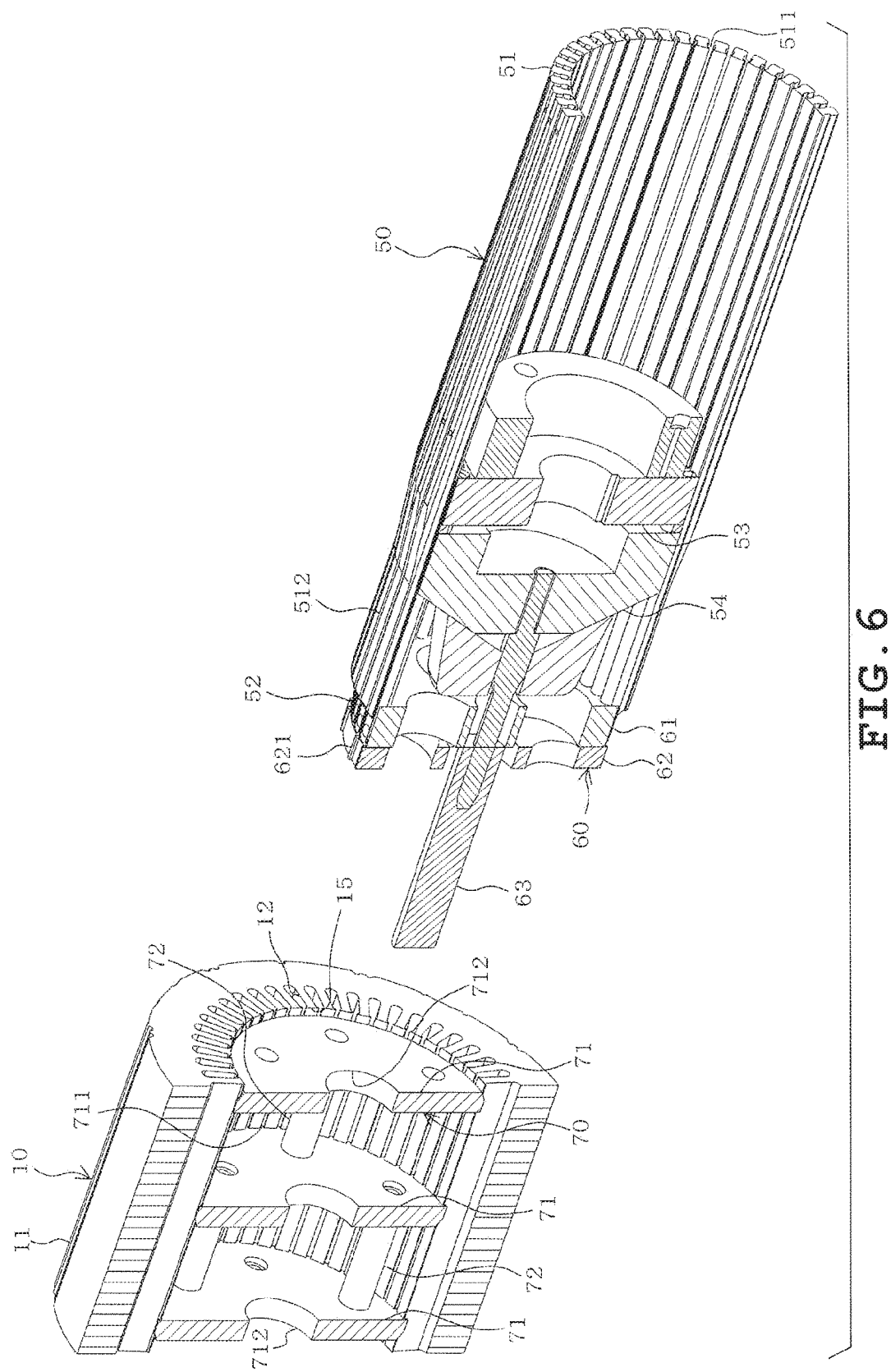
FIG. 6 is perspective cross-sectional view of a coil inserting jig, aligning jig, and a coil retaining jig.

The blade holder 53 is generally shaped like a circular disc as illustrated in FIG. 6. The blades 52 are disposed so as to be equally spaced from one another along the circumference of the blade holder 53. The base end of each blade 52 is secured to the blade holder 53. The blades 52 thus collectively define a cylindrical shape. A spacing 522 is formed between each of the blades 52. Coils 211, 221, 212, and 222 are passed through the spacings 522.

A stripper 54 is provided in the inner side of the cylindrical shape formed by the blade holders 53. The stripper 54 is formed into a shape of a circular truncated cone which becomes narrower toward the direction moving away from the blade holder 53. Though not illustrated in detail, grooves fitting with the blades 52 are provided on the outer peripheral portion of the stripper 54. The stripper 54 slides along the inner side of the cylindrical shape formed of the blade holders 53. That is, the blades 52 and the blade holders 53 are configured to be movable relative to the stripper 54.

As illustrated in FIG. 10, a first shaft 55 is secured to the blade holder 53. A second shaft 56 is secured to the stripper 54. The first shaft 55 is hollow. The second shaft 56 is passed through the inner side of the first shaft 55. The first shaft 55 and the second shaft 56 are relatively movable in the axial direction. The first shaft 55 and the second shaft 56 are each connected to a drive source such as a cylinder not illustrated. Thus, the blades 52, the blade holders 53, and the stripper 54 are configured to move in a stepwise manner. That is, the movement of the first shaft 55 causes the movement of the blades 52, the blade holder 53, and the stripper 54. The movement of the second shaft 56 causes the movement of the stripper 54.

Figure 7:
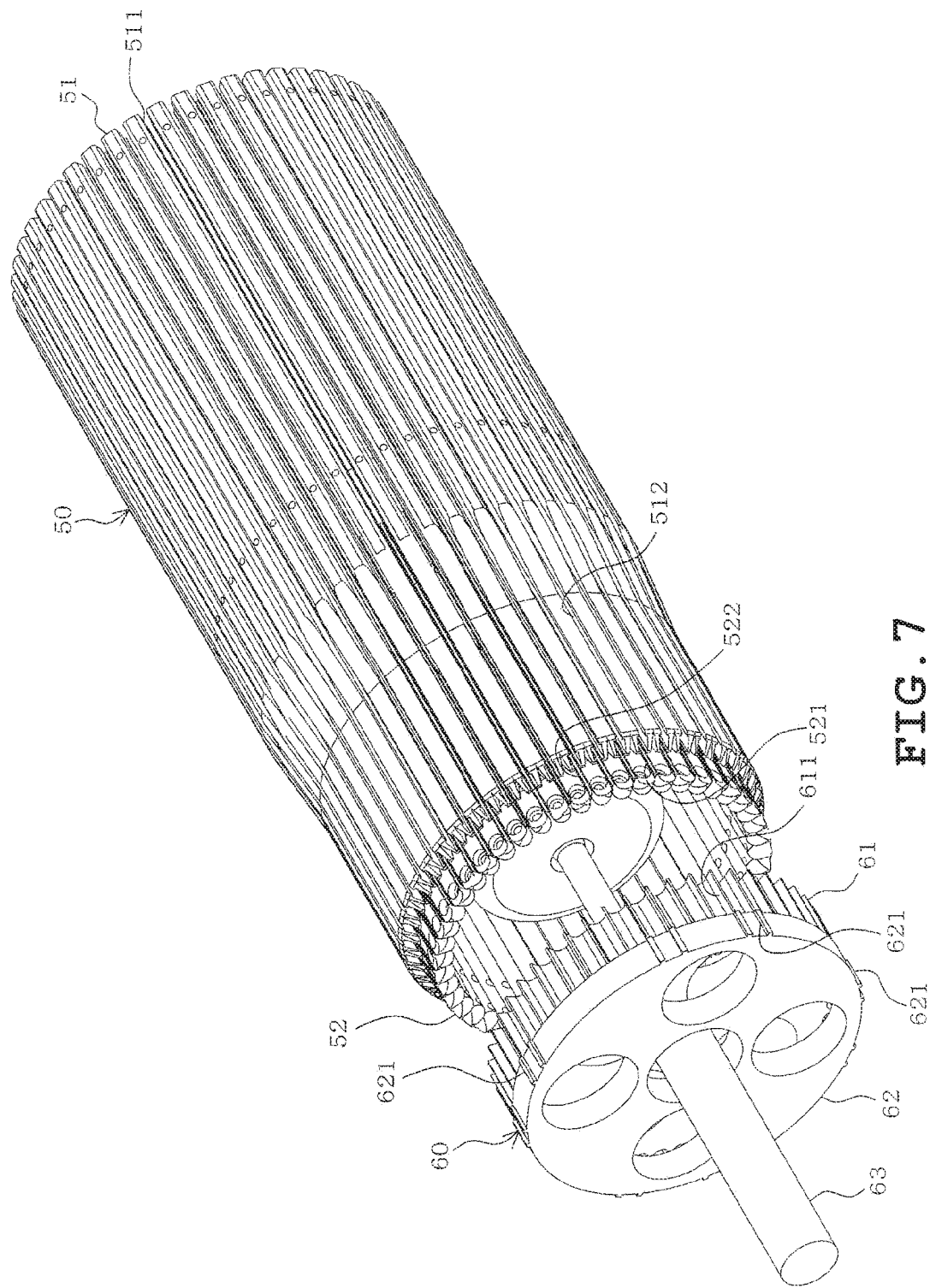
FIG. 7 is a perspective view of a coil inserting jig and an aligning jig.

As illustrated in FIGS. 6 and 7, the aligning jig 60 is provided with a blade guide 61, a teeth guide 62, and a gripping bar 63. The aligning jig 60 is configured to inhibit deformation of the blades 52, etc. of the coil inserting jig 50 when they receive force during insertion of the coils. The blade guide 61 is generally shaped like a circular disc. As illustrated in FIG. 7, blade grooves 611 are formed on the outer peripheral portion of the blade guide 61. The number of blade grooves 611 is equivalent to the number of blades 52. The blades 52 are placed in fitting engagement with the blade grooves 611 of the blade guide 61. Thus, the base end side of each blade 52 is secured to the blade holder 53 while the distal end side is held by the blade guide 61 to maintain a cylindrical shape as a whole.

The teeth guide 62 is generally shaped like a circular disc and is provided on one side of the blade guide 61 located in the opposite side of the coil inserting jig 50. Plural guide protrusions 621 are provided on the outer peripheral portion of the teeth guide 62. The guide protrusions 621 are inserted into the spaces between the teeth 15 to prevent the aligning jig 60 from rotating relative to the stator core 11. The gripping bar 63 is shaped in the form of a cylindrical bar and is secured to the blade guide 61 and the teeth guide 62. The user is to hold the aligning jig 60 by the gripping bar 63 to mount/dismount the alignment jig 60 to/from the coil inserting jig 50.

Figure 9:
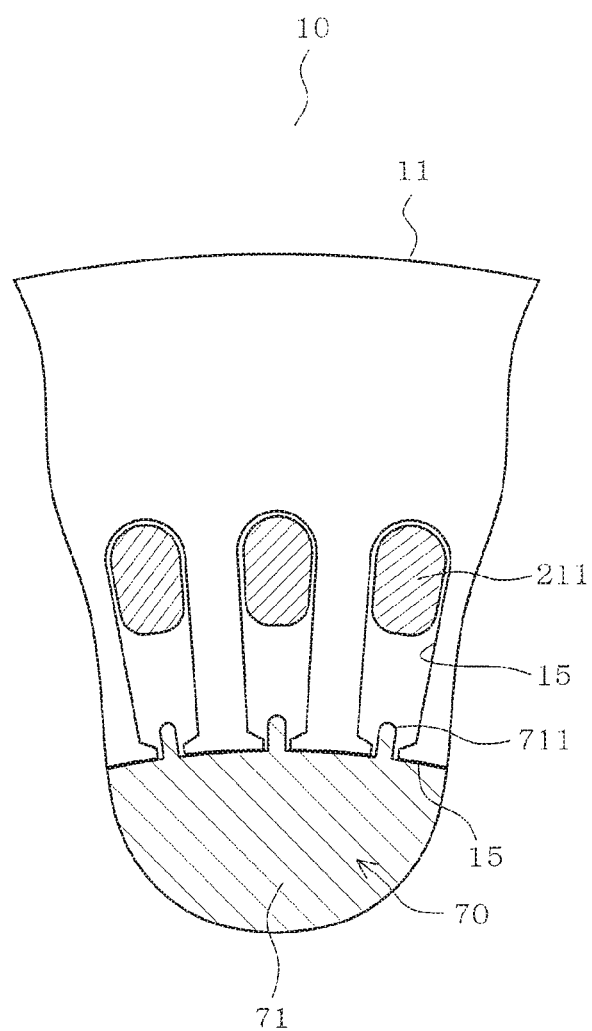
FIG. 9 is a partial cross-sectional view of the stator core having the coil retaining jig inserted therein.

The coil retaining jig 70 is configured to press the coil into the slot 12 of the stator core 11 so that the coil inserted into the slot 12 does not come out of the slot 12. As illustrated in FIG. 6, the coil retaining jig 70 is provided with plural discs 71 serving as a main portion and plural connecting portions 72 interconnecting the discs 71. The discs 71 are shaped in the form of a circular disc made of synthetic resin for example. As illustrated in FIG. 9, plural retaining portions 711 associated with each of the slots 12 are provided on the outer peripheral portion of the disc 71. The retaining portions 711 project outward from the outer peripheral portion of the disc 71. The retaining portion 711 is inserted into the slot 12 from the opened side of the slot 12 to enclose the opening. A hole 712 is formed in the central portion of the disc 71 to allow the gripping bar 63 to pass through. The plural connecting portions 72 are shaped like a cylinder for example and are configured to interconnect each of the discs 71.

Each of the unit coils are inserted into the slot 12 as follows when there are X number of rows of unit coils, that is, when the combination coil is divided into X number of subsets. X is an integer equal to or greater than 2. First, the unit coil of the X−1th row is inserted into the slot 12 using the coil inserting jig 50. Then, the coil retaining jig 70 is fitted to the inner side of the stator core 11. When inserting the unit coil of the Xth row into the slot 12, the coil retaining jig 70 is pushed out of the stator core 10 by the aligning jig 60 as the coil inserting jig 50 is inserted into the inner side of the stator core 11. Then, the unit coil of the Xth row is inserted into the slot 12 by the coil inserting jig 50.

In the present embodiment, X representing the number of rows is 2. Thus, unit coils of the first row for each of the poles for each phase are inserted into the slots 12 of the stator core 11 followed by insertion of unit coils of the second-row for each of the poles for each phase into the slots 12. The coils of each of the poles for each phase will be described hereinafter based on the first-row unit coil 211 and the second-row unit coil 212.

Figure 10A:
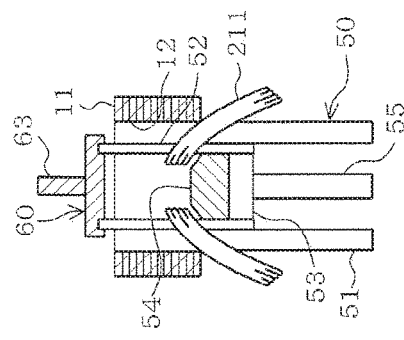

First, a description will be given on how the first-row unit coil 211 is inserted with reference to FIGS. 10A to 10F. The user is to set the first-row unit coils 211 for each of the poles of each phase to the coil inserting jig 50. At this instance, the aligning jig 60 is not attached to the coil inserting jig 50. The first-row unit coils 211 are inserted into the spacings 511 between the blades 52 so as to surround the S number of blades 52 which account for slot pitch S. Then, the aligning jig 60 is attached to the coil inserting jig 50 as illustrated in FIG. 10A.

Figure 10B:
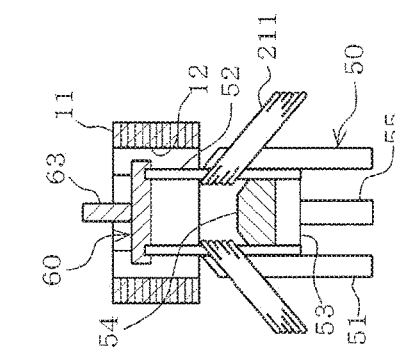

Then, as illustrated in FIG. 10B, the first shaft 55 is moved forward to cause the aligning jig 60 to be moved through the inner side of the stator core 11. As a result, the guide protrusions 621 of the aligning jig 60 are inserted between the teeth 15 of the stator core 11, thereby preventing relative rotation of the aligning jig 60 and the coil inserting jig 50 with respect to the stator core 11. The first shaft 55 is further moved forward with the blades 52 fitted with the teeth 15 to push the blades 52 into the stator core 11.

Figure 10C:
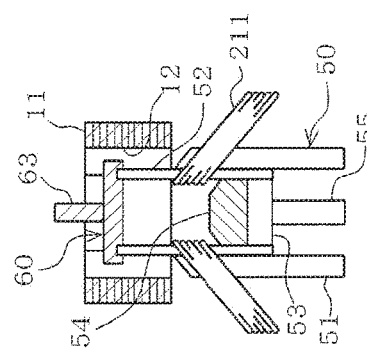
Figure 10D:
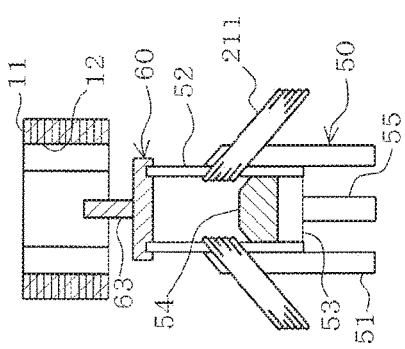
Figure 10E:
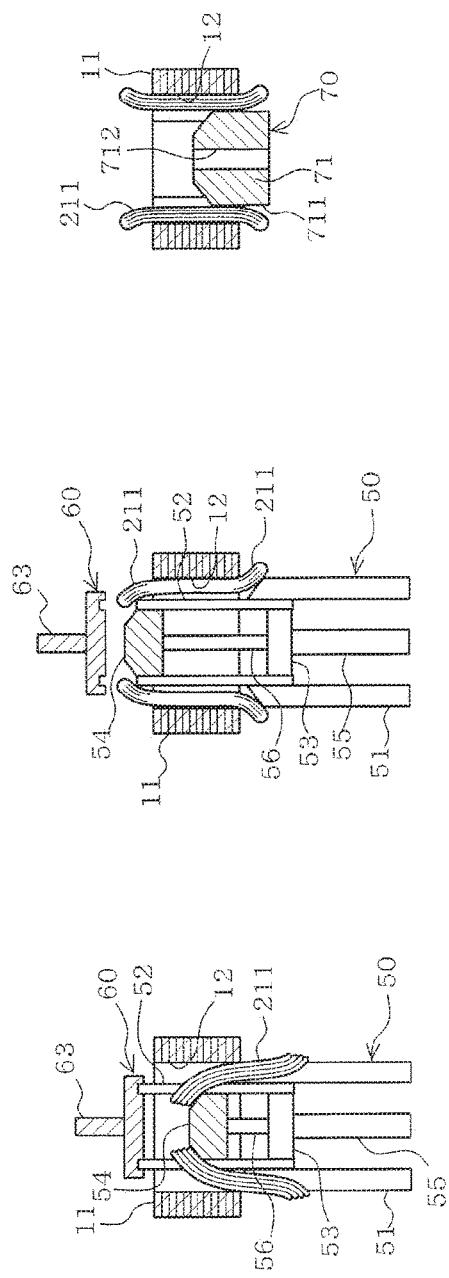
Figure 10F:
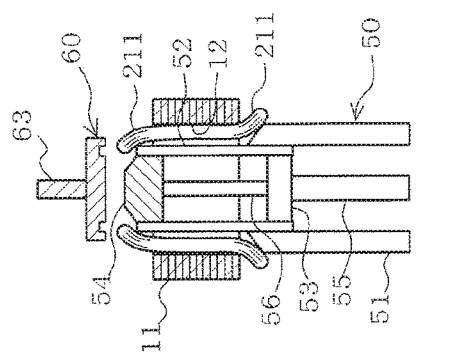

Then, as illustrated in FIG. 10C, the first shaft 55 is further moved forward to move the blades 52 further forward until the tips of the blades 52 are exposed from the distal end of the stator core 11. Thus, the aligning jig 60 passes through the inner side of the stator core 11 to be exposed to the exterior of the stator core 11. Then, as illustrated in FIG. 10D, the second shaft 56 is moved forward to move the stripper 54 forward. As also illustrated in FIG. 8, the first-row unit coil 211 is pushed into the slot 12 by the stripper 54. When the stripper 54 has been advanced to the front end, the aligning jig 60 is removed from the coil inserting jig 50 as illustrated in FIG. 10E. Then, the first-row unit coil 211 surpasses the tips of the blades 52 and is removed from the coil inserting jig 50. The first-row unit coil 211 is inserted into the slot 12 in the above described manner. The coil retaining jig 70 is thereafter inserted through the inner side of the stator core 11 as illustrated in FIG. 10F.

Next, a description will be given on how the second-row unit coil 212 is inserted with reference to FIGS. 11A to 11F. The user is to set the second-row unit coils 212, for each of the poles of each phase, to the coil inserting jig 50 as was the case in the first-row unit coil 211. At this instance, the aligning jig 60 is not attached to the coil inserting jig 50. Then, as illustrated in FIG. 11A, the alignment jig 60 is attached to the coil inserting jig 50.

Then, as illustrated in FIG. 11B, the first shaft 55 is moved forward to cause the aligning jig 60 to be moved through the inner side of the stator core 11. As a result, the guide protrusions 621 of the aligning jig 60 are inserted between the teeth 15 of the stator core 11, thereby preventing relative rotation of the aligning jig 60 and the coil inserting jig 50 with respect to the stator core 11 as was the case in the first-row unit coil 211. The gripping bar 63 of the aligning jig 60 is further passed through the hole 712 of the coil retaining jig 70 at this instance to cause the coil retaining jig 70 to be pushed by the alignment jig 60. Then, the first shaft 55 is further moved forward to push the blade 52 into the stator core 11.

Thereafter, as illustrated in FIG. 11C, the first shaft 55 is further moved forward to move the blades 52 further forward until the tips of the blades 52 are exposed from the distal end of the stator core 11. As a result, the coil retaining jig 70 is pushed out through the inner side of the stator core 11 to thereby remove the coil retaining jig 70 from the stator core 11. Then, as illustrated in FIG. 11D, the second shaft 56 is moved forward to move the stripper 54 forward as was the case in the first-row unit coil 211. As a result, the second-row unit coil 212 is pushed into the slot 12 by the stripper 54.

When the stripper 54 has been advanced to the front end, the aligning jig 60 is removed from the coil inserting jig 50 as illustrated in FIG. 11E. Then, the second-row unit coil 212 surpasses the tips of the blades 52 and is removed from the coil inserting jig 50. The second-row unit coil 212 is inserted into the slot 12 in the above described manner. The insertion of the first-row unit coil 211 and the second-row unit coil 212, for each of the poles of each phase, into the slots 12 is thus, completed as illustrated in FIG. 11F. Thereafter, inter-phase insulation papers 13 and 14 are disposed to spread the coil ends.

As illustrated in FIG. 12, the stator 10 is provided with a first inter-phase insulation paper 13 and plural second inter-phase insulation paper 14. FIG. 12 illustrates a stator 10 provided with 4 poles and 24 slots for ease of explanation. The configuration of the inter-phase insulation paper 13 and the plural inter-phase insulation paper 14 are hardly different from their configuration employed in a stator 10 provided with 4 poles and 48 slots.

As illustrated in FIG. 13A, the first inter-phase insulation paper 13 is configured by for example cutting an aramid paper possessing insulation properties into pieces shaped like a belt and interconnecting the ends of the belt-like pieces into a ring. The first inter-phase insulation paper 13 is provided between unit coils located at both axial ends of the stator core 11 so as to be adjacent to one another in the radial direction of the stator coil 11. Taking the example of the first combination coil 21, the first inter-phase insulation paper 13 is located between the coil end portions of the first-row unit coil 211 and the second-row unit coil 212 which stick out from the slots 12. The first-row unit coil 211 and the second-row unit coil 212 are thus, electrically isolated. As illustrated in FIG. 13B, the second inter-phase insulation paper 14 is configured as a rectangular aramid paper possessing insulation properties. As illustrated in FIG. 12, the second inter-phase insulation paper 14 is provided between the coil end portions of the coils of each phase. Aramid paper is not provided inside the slots 12.

The stator windings 20, 30, and 40 for each of the phases are lap wound coils. It is thus, possible to reduce the amount of windings used as compared to a configuration in which a concentric wound coil is used. Taking the example of the poles in the U phase, each of the poles are configured by the first combination coil 21 and the second combination coil 22. The first combination coil 21 or the second combination coil 22 is divided into two or more unit coils of the same phase, namely, the first-row unit coil 211/221 and the second-row unit coil 212/222.

The first combination coil 21 is configured by disposing the first-row unit coil 211 and the second-row unit coil 212 one over the other in the radial direction of the stator core 11 in the same slot 12, in this example, in the first slot and in the twelfth slot. Similarly, the second combination coil 22 is configured by disposing the first-row unit coil 221 and the second-row unit coil 222 one over the other in the radial direction of the stator core 11 in the same slot 12, in this example, in the second slot and in the thirteenth slot.

By using the first-row unit coil 211/221 and the second-row unit coil 212/222, it is possible to reduce the amount of windings used compared to a configuration in which the windings are not divided into the first-row unit coil 211/221 and the second-row unit coil 212/222. As a result, each of the first-row unit coil 211/221 and the second-row unit coil 212/222 are given more flexibility of arrangement when applying them to the stator core 11 as compared to a configuration in which the windings are not divided into the first-row unit coil 211/221 and the second-row unit coil 212/222. It is thus, possible to facilitate the handling of each of the coils 211, 221, 212, and 222 and thereby facilitate the insertion of the coils 211, 221, 212, and 222 into the slots 12 of the stator core 11. As a result, it is possible to facilitate mechanization of insertion of coils 211, 221, 212, and 222.

The count as well as the thickness of windings used in the second-row unit coil 212/222 are less compared to the count and the thickness of windings used in the first-row unit coil 211/221. This will cause the handling of the first-row unit coil 211/221 to be less flexible compared to the handling of the second-row unit coil 212/222. However, since the first-row unit coil 211/221 is inserted into an empty slot 12 in which coils are yet to be inserted, the insertion of the first-row unit coil 211/221 is relatively easy because of the spaciousness of the slot 12 interior. The handling of the second-row unit coil 212/222 on the other hand, is more flexible compared to the first-row unit coil 211/221 and thus, the insertion of the second-row unit coil 212/222 is relatively easy even when there is not much space left in the slot 12 after the first-row unit coil 211/221 has been inserted. It is thus, possible to facilitate insertion of coils 211, 221, 212, and 222 into the slots 12 of the stator core 11. As a result, it is possible to facilitate mechanization of insertion of coils 211, 221, 212, and 222.

The first-row unit coils 211 and 221 are each configured by a couple of windings of φ 1.1 mm which are turned Y times. In this example, Y is an integer. The second-row unit coils 212 and 222 are each configured by a single winding of φ 1.0 mm which are turned Y times. Thus, the combination coils 21 and 22 are each configured by a couple of windings of φ 1.1 mm and a single winding of φ 1.0 mm. In the present embodiment, Y=26. In this case, the count of lead wires of the first-row unit coils 211 and 221 amount to 2 lines×2=4 lines and the count of the lead wires of the second-row unit coils 212 and 222 amount to 1 line×2=2 lines. Thus, the total count of lead wires of each of the combination coils 21 and 22 amount to 2 lines×2+1 line×2=6 lines.

A comparative example is prepared in which the first-row unit coils 211 and 221 are each configured by a couple of windings of φ 1.1 mm being turned Y/2 times and the second-row unit coils 212 and 222 are each configured by a single winding of φ 1.0 mm being turned Y/2 times. The combination coils 21 and 22 are thus, configured by a couple of windings of φ 1.1 mm and a single winding of φ 1.0 mm which are each turned Y times. In this case, the total count of lead wires amount to (2+1) lines×4=12 lines. It is thus, possible in the present embodiment to reduce the total count of lead wires compared to the comparative example, in this example, to half of the comparative example. The lead wires, serving as the terminating ends each coil, are normally cut by a predetermined length. The cut portions are disposed of and thus, are wasteful. Because it is possible to reduce the total count of lead wires of the first combination coil 21 and the second combination coil 22 in the present embodiment, it is also possible to reduce the amount of portions being cut and disposed of. As a result, it is possible to reduce the amount of windings being used to manufacture the coils 21 and 22.

Alternatively, the first-row coils 211 and 221 may each be configured by a single winding of φ 1.1 mm and a single winding of φ 1.0 mm amounting to a total of 2 windings and the second-row unit coils 212 and 222 may each be configured by a single winding of φ 1.1 mm. This will also allow the handling of the second-row unit coils 212 and 222 to be more flexible compared to the first-row coils 211 and 221 and further reduce the total count of the lead wires to consequently reduce the amount of windings being wastefully disposed of during the manufacturing process.

An insulation paper is not provided inside the slot 12. Thus, the space inside the slot 12 is not pressured by the insulation paper. As a result, greater space is available inside the slots 12 for inserting coils 211, 212, 221, and 222. Since the insulation paper is not provided inside the slot 12, the coils 211, 212, 221, and 222 will not suffer any resistance when being inserted into the slots 12. It is thus, possible to facilitate insertion of coils 211, 221, 212, and 222 into the slots 12. As a result, it is possible to facilitate mechanization of insertion of coils 211, 221, 212, and 222.

The manufacturing method of the present embodiment employs a coil retaining jig 70. The coil retaining jig 70 is fitted into the stator core 11 to enclose the opening of the slot 12 and thereby preventing the coil once disposed inside the slot 12 from coming out of the opening of the slot 12. More specifically, the first-row unit coils 211 and 221 are inserted into the slots 12, whereafter the coil retaining jig 70 is fitted into the stator core 11. Then, the coil retaining jig 70 is pushed apart from the stator core 11 and the second-row unit coils 212 and 222 are inserted into the slots 12. It is thus, possible to facilitate insertion of the second-row unit coils 212 and 222 into the slots 12.

Second Embodiment

Next, a description will be given on a second embodiment with reference to FIG. 14.

In the second embodiment, the first combination coil 21 comprises the first-row unit coil 211, the second-row unit coil 212, and a third-row unit coil 213. Similarly, the second combination coil 22 comprises the first-row unit coil 221, the second-row unit coil 222, and a third-row unit coil 223. As a result, it is possible improve the flexibility in the arrangement of each of the unit coils 211, 212, 213, 221, 222, and 223 while also allowing them to be handled more easily. As a result, it is possible to facilitate mechanization of insertion of coils 211, 212, 213, 221, 222, and 223 into the slots 12.

Third Embodiment

Next, a description will be given on a third embodiment with reference to FIG. 15.

In the present embodiment, the stator 10 is configured by 2 poles and 36 slots. The configuration of the stator windings 20, 30, and 40 of each phase are the same in this example as well. Each of the poles of the U-phase stator winding 20 for example are configured by the first combination coil 21, the second combination coil 22, and a third combination coil 23. The first combination coil 21 is placed in the first slot and the tenth slot. The second combination coil 22 is placed in a location shifted by 1 slot from the first combination coil 21, that is, in the second slot and the eleventh slot. The third combination coil 23 is placed in a location shifted by 1 slot from the second combination coil 22, that is, in the third slot and the twelfth slot. In this example, coil pitch K of each combination coil 21, 22, and 23 is K=50%; slot pitch S=9; pole count P=2; and slot count Z=36.

The configuration of the third combination coil 23 is similar to the configurations of the first combination coil 21 and the second combination coil 22. That is, the third combination coil 23 comprises a first-row unit coil 231 and a second-row unit coil 232. The configuration of the first-row unit coil 231 of the third combination coil 23 is similar to the configuration of the first-row unit coil 211 of the first combination coil 21 and the configuration of the first-row unit coil 221 of the second combination coil 22. The configuration of the second-row unit coil 232 of the third combination coil 23 is similar to the configuration of the second-row unit coil 212 of the first combination coil 21 and the configuration of the second-row unit coil 222 of the second combination coil 22.

Accordingly, it is possible for a stator of a rotary electric machine, exemplified by stator 10, having 2 poles and 36 slots to achieve the effects similar to those of the foregoing embodiments.

Fourth Embodiment

Next, a description will be given on a fourth embodiment with reference to FIG. 16.

In the present embodiment, the stator 10 is configured by 2 poles and 36 slots. The configuration of the stator windings 20, 30, and 40 of each phase are the same in this example as well. Each of the poles of the U-phase stator winding 20 for example comprises the first combination coil 21, the second combination coil 22, and the third combination coil 23. The first combination coil 21 is placed in the first slot and the sixteenth slot. The second combination coil 22 is placed in a location shifted by 1 slot from the first combination coil 21, that is, in the second slot and the seventeenth slot. The third combination coil 23 is placed in a location shifted by 1 slot from the second combination coil 22, that is, in the third slot and the eighteenth slot. In this example, coil pitch K of each combination coil 21, 22, and 23 is K=83.3%; slot pitch S=15; pole count P=2; and slot count Z=36.

Accordingly, it is possible for a stator of a rotary electric machine, exemplified by stator 10, having 2 poles and 36 slots to achieve the effects similar to those of the foregoing embodiments.

Fifth Embodiment

Next, a description will be given on a fifth embodiment with reference to FIG. 17.

In the present embodiment, the stator 10 is configured by 2 poles and 24 slots. The configuration of the stator windings 20, 30, and 40 of each phase are the same in this example as well. Each of the poles of the U-phase stator winding 20 for example comprises the first combination coil 21 and the second combination coil 22. The first combination coil 21 is placed in the first slot and the eleventh slot. The second combination coil 22 is placed in a location shifted by 1 slot from the first combination coil 21, that is, in the second slot and the twelfth slot. In this example, coil pitch K of each combination coil 21 and 22 is K=83.3%; slot pitch S=10; pole count P=2; and slot count Z=24.

Accordingly, it is possible for a stator of a rotary electric machine, exemplified by stator 10, having 2 poles and 24 slots to achieve the effects similar to those of the foregoing embodiments.

Sixth Embodiment

Next, a description will be given on a sixth embodiment with reference to FIG. 18.

In the present embodiment, the stator 10 is configured by 2 poles and 48 slots. The configuration of the stator windings 20, 30, and 40 of each phase are the same in this example as well. Each of the poles of the U-phase stator winding 20 for example comprises the first combination coil 21, the second combination coil 22, the third combination coil 23, and a fourth combination coil 24. The first combination coil 21 is placed in the first slot and the twenty first slot. The second combination coil 22 is placed in a location shifted by 1 slot from the first combination coil 21, that is, in the second slot and the twenty second slot. The third combination coil 23 is placed in a location shifted by 1 slot from the second combination coil 22, that is, in the third slot and the twenty third slot. The fourth combination coil 24 is placed in a location shifted by 1 slot from the third combination coil 23, that is, in the fourth slot and the twenty fourth slot. In this example, coil pitch K of each combination coil 21, 22, 23, and 24 is K=83.3%; slot pitch S=20; pole count P=2; and slot count Z=48.

The fourth combination coil 24 comprises a first-row unit coil 241 and a second-row unit coil 242. The configuration of the first-row unit coil 241 of the fourth combination coil 24 is similar to the configuration of the first-row unit coil 211 of the first combination coil 21, the first-row unit coil 221 of the second combination coil 22, and the first-row unit coil 231 of the third combination coil 23. The configuration of the second-row unit coil 242 of the fourth combination coil 24 is similar to the configuration of the second-row unit coil 212 of the first combination coil 21, the second-row unit coil 222 of the second combination coil 22, and the second-row unit coil 232 of the third combination coil 23.

Accordingly, it is possible for a stator of a rotary electric machine, exemplified by stator 10, having 2 poles and 48 slots to achieve the effects similar to those of the foregoing embodiments.

Seventh Embodiment

Next, a description will be given on a seventh embodiment with reference to FIG. 19.

In the present embodiment, the stator 10 is configured by 6 poles and 36 slots. The configuration of the stator windings 20, 30, and 40 of each phase are the same in this example as well. Each of the poles of the U-phase stator winding 20 for example comprises the first combination coil 21. The first combination coil 21 is placed in the first slot and the eighth slot. In this example, coil pitch K of the first combination coil 21 is K=116.7%; slot pitch S=7; pole count P=6; and slot count Z=36.

Accordingly, it is possible for a stator of a rotary electric machine, exemplified by stator 10, having 6 poles and 36 slots to achieve the effects similar to those of the foregoing embodiments.

Eight Embodiment

Next, a description will be given on an eighth embodiment with reference to FIG. 20.

In the present embodiment, the stator 10 is configured by 6 poles and 54 slots. The configuration of the stator windings 20, 30, and 40 of each phase are the same in this example as well. Each of the poles of the U-phase stator winding 20 for example comprises the first combination coil 21, the second combination coil 22, and a third combination coil 23. The first combination coil 21 is placed in the first slot and the tenth slot. The second combination coil 22 is placed in a location shifted by 1 slot from the first combination coil 21, that is, in the second slot and the eleventh slot. The third combination coil 23 is placed in a location shifted by 1 slot from the second combination coil 22, that is, in the third slot and the twelfth slot. In this example, coil pitch K of each combination coil 21, 22, and 23 is K=100%; slot pitch S=9; pole count P=6; and slot count Z=54.

Accordingly, it is possible for a stator of a rotary electric machine, exemplified by stator 10, having 6 poles and 54 slots to achieve the effects similar to those of the foregoing embodiments.

Ninth Embodiment

Next, a description will be given on a ninth embodiment with reference to FIG. 21.

In the present embodiment, the stator 10 is configured by 6 poles and 72 slots. The configuration of the stator windings 20, 30, and 40 of each phase are the same in this example as well. Each of the poles of the U-phase stator winding 20 for example comprises the first combination coil 21 and the second combination coil 22. The first combination coil 21 is placed in the first slot and the eleventh slot. The second combination coil 22 is placed in a location shifted by 1 slot from the first combination coil 21, that is, in the second slot and the twelfth slot. In this example, coil pitch K of each combination coil 21 and 22 is K=83.3%; slot pitch S=10; pole count P=6; and slot count Z=72.

Accordingly, it is possible for a stator of a rotary electric machine, exemplified by stator 10, having 6 poles and 72 slots to achieve the effects similar to those of the foregoing embodiments.

Tenth Embodiment

Next, a description will be given on a ninth embodiment with reference to FIGS. 4, 22A and 22B.

The tenth embodiment differs from the first embodiment in the configuration of the combination coils 21 and 22. A description will be given based on the first combination coil 21 since the configuration of the combination coils 21 and 22 are the same. The first combination coil 21 is configured by windings having two or more different wire diameters as was the case in the first embodiment. In this example, the first combination coil 21 is configured by a couple of windings of φ 1.1 mm and a single winding of φ 1.0 mm. The first-row unit coil 211 is configured by a total of 2 windings, namely, a single winding of φ 1.1 mm and a single winding of φ 1.0 mm as illustrated in FIG. 22A. On the other hand, the second-row unit coil 212 is configured by a single winding of φ 1.1 mm.

Among the first-row unit coil 211 and the second-row unit coil 212 forming the first combination coil 21, the second-row unit coil 212 disposed in the radially inner side of the stator core 11 includes the greater of the windings having two or more different wire diameters. That is, the second-row unit coil 212 includes the winding of φ 1.1 mm which is the greater of two types of windings namely, φ 1.0 mm and φ 1.1 mm.

As was the case in the first embodiment described above, the perimeter of the second-row unit coil 212 is less than the perimeter of the first-row unit coil 211 illustrated in FIG. 4. That is, among the unit coils 211 and 212 forming the first combination coil 21, the perimeter of the second-row unit coil 212 disposed in the radially inner side of the stator core 11 is less than the perimeter of the first-row unit coil 211 disposed in the radially outer side of the stator core 11.

Because the perimeter of the second-row unit coil 212 is less than the perimeter of the first-row unit coil 211 as illustrated in FIG. 4, it is possible to reduce the height of the coil ends of the second-row unit coil 212 disposed in the inner side. It is further possible to reduce the portion of the second-row unit coil 212 disposed outside the slot 12, in other words, reduce the length of the portion of the second-row unit coil 212 extending from one slot 12 to another slot 12. It is thus, possible to reduce the wasteful use of the windings more effectively.

The second-row unit coil 212 includes the greater of the windings having two or more different wire diameters, which is, in this example, the winding of φ 1.1 mm. As a result, it is possible to reduce the amount of windings by a greater margin when the perimeter of the second-row unit coil 212 is reduced. It is thus possible to reduce the wasteful use of the windings even more effectively.

In the embodiments described above, windings for each of the poles of each of the phases are formed of a single layer lap-wound coil. The single layer lap-wound coil comprises combination coils configured by two or more divided unit coils of the same phase being disposed one over the other in a radial direction inside slots of the stator core.

It is thus, possible to reduce wasteful use of windings compared to a configuration in which concentric wound coils are employed. It is further possible to arrange the unit coils in a more flexible manner and thereby facilitate the handling of the unit coils. This allows the unit coils to be inserted into the slots of the stator core more easily. As a result, it is possible to facilitate the mechanization of insertion of the coils.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stator winding of a rotary electric machine comprising:
   windings for each pole of each phase being configured by a single layer lap wound coil, the single layer lap-wound coil comprising combination coils each configured by two or more divided unit coils of the same phase being disposed one over the other in a radial direction inside slots of a stator core;
   wherein the combination coils each comprise a first-row unit coil and a second-row unit coil disposed in a radially inner side of the stator core with respect to the first-row unit coil;
   wherein a turns count of the first-row unit coil equals a turns count of the second-row unit coil; and
   wherein a count of lead wires of the first-row unit coil differs from a count of lead wires of the second-row unit coil.

2. The stator winding of a rotary electric machine according to claim 1, wherein the combination coils have the same coil pitch.

3. The stator winding of a rotary electric machine according to claim 2, wherein the coil pitch is either of 116.7%, 100%, 83.3%, and 50%.

4. The stator winding of a rotary electric machine according to claim 1, wherein each of the combination coils comprise windings having two or more wire diameters, wherein among the unit coils, a unit coil disposed in the radially inner side of the stator core includes a wiring having the greater of the two or more wire diameters, and wherein among the unit coils, a perimeter of the unit coil disposed in the radially inner side of the stator core is less than a perimeter of the unit coil disposed in the radially outer side of the stator core.

5. A stator of a rotary electric machine provided with the stator winding of a rotary electric machine according to claim 1, the stator being provided with an insulation sheet between each of the unit coils disposed adjacent in the radial direction of the stator core.

6. A method of manufacturing a stator of a rotary electric machine provided with the stator winding of a rotary electric machine according to claim 1, comprising:
   inserting an X−1th row unit coil into the slots, where X is an integer equal to or greater than 2 and represents a count of rows of the unit coils;
   fitting a coil retaining jig with the stator core to enclose an opening of the slots; and
   pushing the coil retaining jig apart from the stator core and inserting an Xth row unit coil into the slots.

7. A jig used in the method of manufacturing a stator of a rotary electric machine according to claim 6 comprising:
   a main portion configured to be fitted to the stator core; and a retaining portion protruding from the main portion and being configured to be inserted into the slots to enclose openings of the slots and thereby preventing the unit coils from coming out of the slots.

* * * * *